(12) United States Patent
Cui et al.

(10) Patent No.: US 10,341,378 B2
(45) Date of Patent: Jul. 2, 2019

(54) METHODS, SYSTEMS, AND MEDIA FOR INHIBITING ATTACKS ON EMBEDDED DEVICES

(71) Applicant: The Trustees of Columbia University in the City of New York, New York, NY (US)

(72) Inventors: Ang Cui, New York, NY (US); Salvatore J. Stolfo, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/136,581

(22) Filed: Apr. 22, 2016

(65) Prior Publication Data

US 2017/0099302 A1    Apr. 6, 2017

Related U.S. Application Data

(63) Continuation of application No. 14/379,166, filed as application No. PCT/US2013/026529 on Feb. 15, 2013, now Pat. No. 9,392,017.

(Continued)

(51) Int. Cl.
*G06F 21/54* (2013.01)
*H04L 29/06* (2006.01)
(Continued)

(52) U.S. Cl.
CPC ............ *H04L 63/145* (2013.01); *G06F 21/54* (2013.01); *G06F 21/572* (2013.01); *G06F 21/64* (2013.01); *H04L 63/20* (2013.01)

(58) Field of Classification Search
CPC .......... G06F 21/50; G06F 21/55; G06F 21/56; G06F 21/57; G06F 21/572
See application file for complete search history.

(56) References Cited

U.S. PATENT DOCUMENTS

| 6,052,778 A | 4/2000 | Hagy et al. |
| 6,253,317 B1 | 6/2001 | Knapp et al. |

(Continued)

OTHER PUBLICATIONS

"Binwalk", last updated Jul. 25, 2014, pp. 1-2, available at: https://github.com/devttys0/binwalk/wiki.

(Continued)

*Primary Examiner* — Khang Do
(74) *Attorney, Agent, or Firm* — Byrne Poh LLP

(57) ABSTRACT

Methods, systems, and media for inhibiting attacks on embedded devices are provided. In some embodiments, a system for inhibiting on embedded devices is provided, the system comprises a processor that is configured to: identify an embedded device that is configured to provide one or more services to one or more digital processing devices within a communications network; receive a first firmware associated with the embedded device; generate a second firmware that is functionally equivalent to the first firmware by: determining unused code within the first firmware; removing the unused code within the second firmware; and restructuring remaining code portions of the first firmware into memory positions within the second firmware; and inject the second firmware into the embedded device.

29 Claims, 20 Drawing Sheets

Related U.S. Application Data

(60) Provisional application No. 61/765,646, filed on Feb. 15, 2013, provisional application No. 61/602,061, filed on Feb. 22, 2012, provisional application No. 61/599,377, filed on Feb. 15, 2012.

(51) Int. Cl.
*G06F 21/64* (2013.01)
*G06F 21/57* (2013.01)

(56) References Cited

U.S. PATENT DOCUMENTS

| | | | |
|---|---|---|---|
| 6,874,087 B1 * | 3/2005 | Fetkovich | G06F 21/54 713/168 |
| 7,386,839 B1 | 6/2008 | Golender et al. | |
| 7,596,721 B1 | 9/2009 | Flake et al. | |
| 8,001,596 B2 * | 8/2011 | Wollnik | G06F 21/54 713/189 |
| 8,239,836 B1 * | 8/2012 | Franz | G06F 11/1487 717/127 |
| 8,266,597 B2 | 9/2012 | Panchamukhi et al. | |
| 8,510,596 B1 * | 8/2013 | Gupta | G06F 11/073 714/15 |
| 2001/0037494 A1 * | 11/2001 | Levien | G06F 8/20 717/141 |
| 2002/0013938 A1 | 1/2002 | Duesterwald et al. | |
| 2002/0199172 A1 | 12/2002 | Bunnell | |
| 2003/0023856 A1 * | 1/2003 | Horne | G06F 11/3624 713/187 |
| 2003/0115580 A1 | 6/2003 | Arai et al. | |
| 2003/0163508 A1 | 8/2003 | Goodman | |
| 2003/0204374 A1 | 10/2003 | Madsen et al. | |
| 2004/0143828 A1 * | 7/2004 | Liu | G06F 8/665 717/168 |
| 2004/0168157 A1 | 8/2004 | Hundt et al. | |
| 2004/0237068 A1 | 11/2004 | Ren | |
| 2005/0060522 A1 | 3/2005 | Correa | |
| 2005/0063242 A1 | 3/2005 | Ren | |
| 2005/0108562 A1 | 5/2005 | Khazan et al. | |
| 2006/0107268 A1 | 5/2006 | Chrabieh | |
| 2006/0161985 A1 | 7/2006 | Zhao | |
| 2006/0174226 A1 | 8/2006 | Fair et al. | |
| 2006/0277539 A1 | 12/2006 | Amarasinghe et al. | |
| 2007/0022428 A1 | 1/2007 | Yamasaki | |
| 2007/0055711 A1 | 3/2007 | Polyakov et al. | |
| 2007/0226717 A1 * | 9/2007 | Shtilman | G06F 8/443 717/151 |
| 2007/0274230 A1 | 11/2007 | Werber et al. | |
| 2008/0083030 A1 | 4/2008 | Durham et al. | |
| 2008/0291017 A1 | 11/2008 | Yermal et al. | |
| 2009/0249368 A1 | 10/2009 | Needamangala et al. | |
| 2010/0011243 A1 | 1/2010 | Locasto et al. | |
| 2010/0275173 A1 | 10/2010 | McDonald et al. | |
| 2010/0325704 A1 | 12/2010 | Etchegoyen et al. | |
| 2011/0088095 A1 * | 4/2011 | Stewart | G06F 21/14 726/25 |
| 2011/0219452 A1 | 9/2011 | Porter | |
| 2011/0276837 A1 * | 11/2011 | Potter | G06F 11/073 714/42 |
| 2012/0011219 A1 | 1/2012 | Zhang et al. | |
| 2012/0017262 A1 | 1/2012 | Kapoor et al. | |
| 2013/0191624 A1 * | 7/2013 | Jarmay | G11C 5/14 713/2 |
| 2016/0021121 A1 | 1/2016 | Cui et al. | |

OTHER PUBLICATIONS

"Buffer Overflow 6: The Function Stack", last accessed: Oct. 4, 2016, pp. 1-12, available at: http://www.tenouk.com/Bufferoverflowc/Bufferoverflow2a.html.

"IRC DDOS Bot", last accessed Jun. 10, 2010, pp. 1-17, available at: http://packetstormsecurity.nl/irc/kaiten.c.

Abma, J., "Virata EmWeb R6.0.1 Remote Crash Vulnerability", Technical Report, Jun. 4, 2010, pp. 1, available at: http://www.exploit-db.com/exploits/12095/.

Apcmag.com, "New Worm can Infect Home Modem/Routers", last updated 2009, pp. 1-8, available at: http://apcmag.com/Content.aspx?id=3687.

Arce, I., "The Rise of the Gadgets", In IEEE Security and Privacy, vol. 99, No. 5, Sep.-Oct. 2003, pp. 78-81.

Aviv, A.J. et al., "Security Evaluation of ES&S Voting Machines and Election Management System", In Proceedings of the USENIX/ACCURATE Electronic Voting Workshop, San Jose, CA, US, Jul. 28-29, 2008, pp. 1-13.

Bellissimo, A. et al., "Secure Software Updates: Disappointments and New Challenges", In Proceedings of the 1st USENIX Hot Topics in Security (HotSec), Vancouver, BC, CA, Jul. 31-Aug. 4, 2006, pp. 1-7.

CERT, "CERT Advisory CA-2002-07: Double Free Bug in zlib Compression Library", Technical Report, Mar. 12, 2002, pp. 1-7, available at: http://www.cert.org/advisories/CA-2002-07.html.

Chang, H. and Atallah, M.J., "Protecting Software Code by Guards", In Proceedings of the Digital Rights Management Workshop, Philadelphia, PA, US, Nov. 5, 2001, pp. 160-175.

Chen, K., "Reversing and Exploiting an Apple Firmware Update", In Proceedings of Black Hat USA, Las Vegas, NV, US, Jul. 25-30, 2009, pp. 1-190.

Costin, A., "Hacking MFPs: Part 2—Postscript: Um, You've Been Hacked", In Proceedings of the 28th Chaos Communication Congress, Berlin, DE, Dec. 27-30, 2011, pp. 1-44.

Cui, A. and Stolfo, S.J., "A Quantitative Analysis of the Insecurity of Embedded Network Devices: Results of a Wide-Area Scan", In Proceedings of the 26th Annual Computer Security Applications Conference (ACSAC '10), Austin, TX, US, Dec. 6-10, 2010, pp. 97-106.

Cui, A. and Stolfo, S.J., "Defending Embedded Systems with Software Symbiotes", In Proceedings of Recent Advances in Intrusion Detection (RAID), 14th International Symposium, Menlo Park, CA, US, Sep. 20-21, 2011, pp. 358-377.

Cui, A. and Stolfo, S.J., "Print Me If You Dare: Firmware Modification Attacks and the Rise of Printer Malware", In Proceedings of the 28th Chaos Communication Congress, Berlin, DE, Dec. 27-30, 2011, pp. 1-2.

Cui, A. and Stolfo, S.J., "Software Symbiotes, Self-Monitoring-Monitors and Autotomic Binary Structure Randomization", Feb. 21, 2012, pp. 1-8.

Cui, A. and Stolfo, S.J., "Symbiotes and Defensive Mutualism: Moving Target Defense", In Advances in Information Security: Moving Target Defense, vol. 54, Aug. 26, 2011, pp. 99-108.

Cui, A. et al., "Brave New World: Pervasive Insecurity of Embedded Network Devices", In Proceedings of the 12th International Symposium on Recent Advances in Intrusion Detection (RAID '09), Saint-Malo, Brittany, FR, Sep. 23-25, 2009, pp. 378-380.

Cui, A. et al., "From Prey to Hunter: Transforming Legacy Embedded Devices into Exploitation Sensor Grids", In Proceedings of the 27th Annual Computer Security Applications Conference (ACSAC '11), Orlando, FL, US, Dec. 5-9, 2011, pp. 393-402.

Cui, A. et al., "Killing the Myth of Cisco IOS Diversity: Towards Reliable, Large-scale Exploitation of Cisco IOS", In Proceedings of Blackhat Briefings, Las Vegas, NV, US, Aug. 3-4, 2011, pp. 1-57.

Cui, A. et al., "When Firmware Modifications Attack: A Case Study of Embedded Exploitation", In Proceedings of the 20th Annual Network and Distributed System Security Symposium (NDSS 13), San Diego, CA, US, Feb. 24-27, 2013, pp. 1-13.

Cui, A., "Embedded Device Firmware Vulnerability Hunting Using FRAK", In Proceedings of Black Hat USA, Las Vegas, NV, US, Jul. 21-26, 2012, pp. 1-33.

Dronebl.org, "Network Bluepill—Stealth Router-Based Botnet has been DDoSing Dronebl for the Last Couple of Weeks", last updated Mar. 22, 2009, pp. 1-13, available at: http://www.dronebl.org/blog/8.

DynamoRIO, "Dynamic Instrumentation Tool Platform", Technical Report, updated Sep. 10, 2014, pp. 1-3, available at: http://dynamorio.org/.

(56) References Cited

OTHER PUBLICATIONS

Erlingsson, U. et al., "Xfi: Software Guards for System Address Spaces", In Proceedings of the 7th Symposium on Operating Systems Design and Implementation, Seattle, WA, US, Nov. 6-8, 2006, pp. 75-88.

Extended European Search Report dated May 20, 2016 in European Patent Application No. 13793379.2.

Ghourabi, A. et al., "Honeypot Router for Routing Protocols Protection", In Proceedings of the 4th International Conference on Risks and Security of Internet and Systems (CRiSIS '09), Toulouse, FR, Oct. 19-22, 2009, pp. 127-130.

Halperin, D. et al., "Pacemakers and Implantable Cardiac Defibrillators: Software Radio Attacks and Zero-Power Defenses", In Proceedings of the 29th Annual IEEE Symposium on Security and Privacy, Oakland, CA, US, May 18-21, 2008, pp. 129-142.

Hanna, S. et al., "Take Two Software Updates and See Me in the Morning: The Case for Software Security Evaluations of Medical Devices", In Proceedings of the 2nd USENIX Conference on Health Security and Privacy, San Francisco, CA, US, Aug. 9, 2011, pp. 6-10.

Hewlett-Packard, "HP Security Solutions FAQ", Technical Report, May 2006, pp. 1-10.

Hewlett-Packard, "HP Web JetAdmin: Solution Brief", May 2014, pp. 1-4, available at: http://h20195.www2.hp.com/V2/GetPDF.aspx/4AA5-2718ENW.pdf.

Hewlett-Packard, "SSRT100692 rev.1—Certain HP Printers and HP Digital Senders, Remote Firmware Update Enabled by Default", Nov. 30, 2011, pp. 1-3, available at: http://seclists.org/bugtraq/2011/Dec/3.

Hewlett-Packard, "SSRT100692 rev.2—Certain HP Printers and HP Digital Senders, Remote Firmware Update Enabled by Default", Dec. 27, 2011, pp. 1-8, available at: http://seclists.org/bugtraq/2011/Dec/175.

Hewlett-Packard, "SSRT100692 rev.3—Certain HP Printers and HP Digital Senders, Remote Firmware Update Enabled by Default", Jan. 9, 2012, pp. 1-5, available at: http://seclists.org/bugtraq/2012/Jan/49.

HP Support Communication-Security Bulletin, "HPSBPI02728 SSRT100692 rev.6—Certain HP Printers and HP Digital Senders, Remote Firmware Update Enabled by Default", Technical Report, Nov. 30, 2011, pp. 1-6, available at: http://h20000.www2.hp.com/bizsupport/TechSupport/Document.jsp?objectID=c03102449.

HP, "Hewlett-Packard LaserJet 4200/4300 Series Printers—Firmware Update/Download Release/Installation Notes", last accessed Oct. 9, 2014, pp. 1-10, available at: http://ftp.hp.com/pub/printers/software/lj4200lbreadmefw.txt.

Hunt, G. and Brubacher, D., "Detours: Binary Interception of Win32 Functions", In Proceedings of the 3rd USENIX Windows NT Symposium (WINSYM '99), Seattle, WA, US, Jul. 12-13, 1999, pp. 135-144.

International Data Corporation, "Worldwide Hardcopy Peripherals Market Recorded Double-Digit Year-Over-Year Growth in the Second Quarter of 2010, According to IDC", Sep. 1, 2010, pp. 1-3, available at: http://www.businesswire.com/news/home/20100901005256/en/.

International Preliminary Report on Patentability and Written Opinion dated May 21, 2015 in International Patent Application No. PCT/US2013/026529.

International Search Report and Written Opinion dated Dec. 2, 2013 in International Patent Application No. PCT/US2013/026529.

Jack, B., "Jackpotting Automated Teller Machines Redux", In Proceedings of Black Hat USA, Las Vegas, NV, US, Jul. 28-29, 2010, video available at: https://www.youtube.com/watch?v=FkteGFfvwJO.

Krügel, C. et al., "Detecting Kernel-Level Rootkits Through Binary Analysis", In Proceedings of the 20th Annual Computer Security Applications Conference (ACSAC '04), Tucson, AZ, US, Dec. 6-10, 2004, pp. 91-100.

Li, Y. et al., "SBAP: Software-Based Attestation for Peripherals", In Proceedings of the 3rd International Conference on Trust and Trustworthy Computing (TRUST '10), Berlin, DE, Jun. 21-23, 2010, pp. 16-29.

Li, Y. et al., "VIPER: Verifying the Integrity of PERipherals' Firmware", In Proceedings of the 18th ACM Conference on Computer and Communications Security, Chicago, IL, US, Oct. 17-21, 2011, pp. 3-16.

Ligati, J. et al., "Enforcing Security Policies with Run-time Program Monitors", Technical Report, Princeton University, Feb. 2005, pp. 1-74.

Linder, F., "Cisco IOS Router Exploitation," In Proceedings of Black Hat USA, Las Vegas, NV, US, Jul. 25-30, 2009, pp. 1-10.

Linder, F., "Cisco Vulnerabilities", In Proceedings of Black Hat Federal, Tyson's Corner, VA, US, Oct. 1-2, 2003, pp. 1-48.

Linder, F., "Design Issues and Software Vulnerabilities in Embedded Systems", In Proceedings of Black Hat Windows Security, Seattle, WA, US, Feb. 24-27, 2003, pp. 1-56.

McLaughlin, S. et al., "Embedded Firmware Diversity for Smart Electric Meters", In Proceedings of the 5th USENIX Workshop on Hot Topics in Secuity, Washington, D.C., US, Aug. 20, 2010, pp. 1-6.

Meier, S., "The End of your Internet: Malware for Home Routers", Aug. 4, 2008, pp. 1-6, available at: http://data.nicenamecrew.com/papers/malwareforrouters/paper.txt.

Merriam-Webster Online Dictionary, "Regard", Merriam-Webster, May 14, 2006, pp. 1-2.

Microsoft Corporation, "Kernel Patch Protection: Frequently Asked Questions", Jan. 22, 2007, pp. 1-3, available at: http://msdn.microsoft.com/en-us/library/windows/hardware/Dn613955(v=vs.85).aspx.

Miller, C., "Battery Firmware Hacking", In Proceedings of Black Hat USA, Jul. 12, 2011, Las Vegas, NV, US, pp. 1-38.

Muniz, S., "Killing the Myth of Cisco IOS Rootkits: DIK", In Proceedings of EUSecWest, London, UK, May 21-22, 2008, pp. 1-37.

National Vulnerability Database, "Vulnerability Summary for CVE-2008-4419", Technical Report, Mar. 8, 2011, pp. 1-3, available at: http://web.nvd.nist.gov/view/vuln/detail?vulnId=CVE-2008-4419.

National Vulnerability Database, "Vulnerability Summary for CVE-2011-4161", Technical Report, Feb. 2, 2012, pp. 1-4, available at: http://web.nvd.nist.gov/view/vuln/detail?vulnId=CVE-2011-4161.

National Vulnerability Database, "Vulnerability Summary for CVE-2011-4785", Technical Report, Jan. 18, 2012, pp. 1-3, available at: http://web.nvd.nist.gov/view/vuln/detail?vulnId=CVE-2011-4785.

Newman, T. et al., "SCADA and PLC Vulnerabilities in Correctional Facilities", White Paper, Jul. 30, 2011, pp. 1-14.

Notice of Allowance dated Jan. 22, 2016 in U.S. Appl. No. 14/379,166.

Office Action dated Jun. 7, 2016 in European Patent Application No. 13793379.2.

Office Action dated Jul. 29, 2016 in U.S. Appl. No. 12/765,814.

O'Sullivan, P. et al., "Retrofitting Security in COTS Software with Binary Rewiring", In Proceedings of 26th IFIP TC 11 International Information Security Conference, Lucerne, CH, Jun. 7-9, 2011, pp. 154-172.

Prabhu, P. et al., "Smashing the Stack with Hydra: The Many Heads of Advanced Shellcode Polymorphism", In Proceedings of Defcon 17, Las Vegas, NV, US, Jul. 30-Aug. 2, 2009, pp. 1-20.

Prevelakis, V. and Spinellis, D., "The Athens Affair", In IEEE Spectrum, vol. 44, No. 7, Jul. 2007, pp. 26-33.

pt, "Ooops I hacked My PBX: Why Auditing Proprietary Protocols Matters", In Proceedings of the 28th Chaos Communication Congress, Berlin, DE, Dec. 29, 2011, pp. 1-63.

Riley, R. et al., "Guest-Transparent Prevention of Kernel Rootkits with VMM-Based Memory Shadowing", In Proceedings of the 11th International Symposium on Recent Advances in Intrusion Detection (RAID '08), Cambridge, MA, US, Sep. 15-17, 2008, pp. 1-20.

Rinard, M., "Manipulating Program Functionality to Eliminate Security Vulnerabilities", In Advances in Information Security, vol. 54, Aug. 5, 2011, pp. 109-115.

Roecher, D.J., and Thumann, M., "NAC@ack: Hacking the Cisco NAC Framework", In Proceedings of Black Hat Europe, Amsterdam, NL, Jul. 28-Aug. 2, 2007, pp. 1-29.

(56) References Cited

OTHER PUBLICATIONS

SecurityFocus, "Sec. Vulnerability in ChaiVM EZloader", Jul. 30, 2002, pp. 1-3, available at: http://www.securityfocus.com/advisories/4317.

Seshadri, A. et al., "SWATT: SoftWare-Based ATTestation for Embedded Devices", In Proceedings of the IEEE Symposium on Security and Privacy (S&P '04), Oakland, CA, US, May 9-12, 2004, pp. 272-282.

Skywing, "Subverting PatchGuard Version 2", In Uninformed, vol. 6, Dec. 2006, pp. 1-60.

Spansion, "S25FL064P: 64 Mbit CMOS 3.0 Volt Flash Memory with 104-MHz SPI (Serial Peripheral Interface) Multi I/O Bus", Technical Report, Nov. 18, 2011, pp. 1-67, available at: http://www.spansion.com/Support/Datasheets/S25FL064P_00.pdf.

Stolfo, S.J. et al., "Self-Monitoring Monitors", Technical Report, CUCS-026-09, Columbia University Computer Science Department, Apr. 27, 2009, pp. 1-11.

Sutton, M., "Corporate Espionage for Dummies: The Hidden Threat of Embedded Web Servers", In Proceedings of Black Hat USA, Las Vegas, NV, US, Aug. 3-4, 2011, pp. 1-98.

U.S. Cert-Vulnerability Note VU#238678, "The zlib Compression Library is Vulnerable to a Denial-of-Service Condition", Technical Report, Oct. 1, 2004, pp. 1-3, available at: http://www.kb.cert.org/vuls/id/238678.

U.S. Cert-Vulnerability Note VU#680620, "Zlib Inflate() Routine Vulnerable to Buffer Overflow", Jul. 12, 2005, pp. 1-3, available at: http://www.kb.cert.org/vuls/id/680620.

U.S. Appl. No. 12/765,814, filed Apr. 22, 2010.

U.S. Appl. No. 60/171,643, filed Apr. 22, 2009.

Vasisht, V.R. and Lee, H.H.S., "Shark: Architectural Support for Autonomic Protection Against Stealth by Rootkit Exploits", In Proceedings of the 41st IEEE International Symposium on Microarchitecture, Como, IT, Nov. 8-12, 2008, pp. 106-116.

VxWorks, "socklib", last accessed Apr. 30, 2012, pp. 1-19, available at: http://www-kryo.desy.de/documents/vxWorks/V5.5/vxworks/ref/sockLib.html.

Wang, K. and Stolfo, S.J., "Anomalous Payload-Based Network Intrusion Detection", In Proceedings of the 7th International Symposium on Recent Advances in Intrusion Detection (RAID '04), Sophia Antipolis, FR, Sep. 15-17, 2004, pp. 203-222.

Wang, Z. et al., "Countering Persistent Kernel Rootkits Through Systematic Hook Discovery", In Proceedings of the 11th International Symposium on Recent Advances in Intrusion Detection (RAID '08), Cambridge, MA, US, Sep. 15-17, 2008, pp. 21-38.

A. Cui, "FRAK: Firmware Reverse Analysis Konsole", In Proceedings of Black Hat USA, Jul. 21-26, 2012, Las Vegas, NV, US, pp. 1-33.

FX of Phenoelit, "Attacking Networked Embedded Systems", In Black Hat Windows Security, Feb. 24-27, 2003, Seattle, WA, US, pp. 1-56.

Notice of Allowance dated Apr. 18, 2018 in U.S. Appl. No. 12/765,814.

Office Action dated Jan. 28, 2015 in U.S. Appl. No. 12/765,814.
Office Action dated Apr. 23, 2014 in U.S. Appl. No. 12/765,814.
Office Action dated Sep. 28, 2015 in U.S. Appl. No. 12/765,814.
Office Action dated Oct. 3, 2017 in U.S. Appl. No. 12/765,814.
Office Action dated Oct. 11, 2012 in U.S. Appl. No. 12/765,814.

Cui, A. et al, "Killing the Myth of Cisco IOS Diversity: Recent Advances in Reliable Shellcode Design." In Proceedings of the 5th Usenix Conference on Offensive technologies. Aug. 2011.

Matwyshyn, A., et al., "Ethics in Security Vulnerability Research," in IEEE Security and Privacy 8.2, Mar. 2010, pp. 68-73.

Yang, J., et al, "Concurrency Attacks," in Hotpar 12, Jun. 2012 pp. 1-7.

* cited by examiner

| Original Firmware | | | | | |
|---|---|---|---|---|---|
| 008068 | 00 00 79 00 | 00 AA 55 41 | 54 00 00 01 | 20 00 67 82 | F1 00 E2 17 | 03 00 00 00 | 00 00 67 84 |
| 008084 | 11 00 00 20 | E0 00 00 4D | 3C 00 67 D4 | F1 00 00 21 | 86 00 00 50 | 91 00 67 F6 | 77 00 00 20 |
| 0080A0 | 28 00 00 4D | AA 00 68 16 | 9F 00 00 20 | BC 00 00 50 | 0C 00 68 37 | 53 00 00 20 | C8 00 00 4C |
| 0080BC | C4 00 68 58 | 26 00 00 20 | 83 00 00 4D | BF 00 68 78 | A9 00 00 20 | 23 00 00 48 | 2A 00 68 98 |
| 008008 | CC 00 00 1F | E1 00 00 48 | DB 00 68 88 | AD 00 00 20 | 84 00 00 4D | 5A 00 68 D9 | 31 00 00 21 |
| 0080F4 | 1D 00 00 4E | 12 00 68 FA | 4E 00 00 21 | 42 00 00 50 | 24 00 69 18 | 90 00 00 24 | 0D 00 00 54 |
| 008110 | 2D 00 69 3F | 9D 00 00 24 | 35 00 00 54 | C1 00 69 63 | D2 00 00 23 | 84 00 00 50 | E7 00 69 87 |
| 00812C | 56 00 00 28 | 24 00 00 7A | BE 00 69 AF | 7A 00 00 22 | CD 00 00 50 | D6 00 69 D2 | 47 00 00 21 |
| 008148 | 3E 00 00 52 | CF 00 69 F3 | 85 00 00 1F | F3 00 00 48 | C0 00 6A 13 | 78 00 00 22 | 11 00 00 51 |
| 008164 | FD 00 6A 35 | 89 00 00 22 | 90 00 00 51 | 68 00 6A 58 | 19 00 00 22 | 7C 00 00 50 | 91 00 6A 7A |
| 008180 | 95 00 00 24 | F0 00 00 55 | 9D 00 00 00 | 00 78 9C BC | 7D 0D 7C 54 | C5 D5 F7 DC | FD CA 26 04 |

— 310

— 605

| Fortified Firmware | | | | | |
|---|---|---|---|---|---|
| 008068 | CC 00 00 1F | E1 00 00 48 | DB 00 68 88 | AD 00 00 20 | 84 00 00 4D | 5A 00 68 D9 | 31 00 00 21 |
| 008084 | 1D 00 00 4E | 12 00 68 FA | 4E 00 00 21 | 42 00 00 50 | 24 00 69 18 | 90 00 00 24 | 0D 00 00 54 |
| 0080A0 | 2D 00 69 3F | 9D 00 00 24 | 35 00 00 54 | C1 00 69 63 | D2 00 00 23 | 84 00 00 50 | E7 00 69 87 |
| 0080BC | 56 00 00 28 | 24 00 00 7A | BE 00 69 AF | 7A 00 00 22 | CD 00 00 50 | D6 00 69 D2 | 47 00 00 21 |
| 008008 | 3E 00 00 52 | CF 00 69 F3 | 85 00 00 1F | F3 00 00 48 | C0 00 6A 13 | 78 00 00 22 | 11 00 00 51 |
| 0080F4 | FD 00 6A 35 | 89 00 00 22 | 90 00 00 51 | 68 00 6A 58 | 19 00 00 22 | 7C 00 00 50 | 91 00 6A 7A |
| 008110 | 95 00 00 24 | F0 00 00 55 | 9D 00 00 00 | 00 78 9C BC | 7D 0D 7C 54 | C5 D5 F7 DC | FD CA 26 04 |

Original Firmware

| | | | | | |
|---|---|---|---|---|---|
| 008068 | 00 00 79 00 | 00 AA 55 41 | 54 00 00 01 | 20 00 67 82 | F1 00 E2 17 | 03 00 08 00 | 00 00 67 84 |
| 008084 | 11 00 00 20 | E0 00 00 4D | 3C 00 67 D4 | F1 00 00 21 | 38 00 00 50 | 91 00 67 F6 | 77 00 00 20 |
| 0080A0 | 28 00 00 4D | AA 00 68 16 | 9F 00 00 20 | BC 00 00 50 | 0C 00 68 37 | 58 00 00 20 | CB 00 00 4C |
| 0080BC | C4 00 68 58 | 26 00 00 20 | 83 00 00 4D | BF 00 68 78 | A9 00 00 20 | 23 00 00 48 | 2A 00 68 98 |
| 008008 | CC 00 00 1F | E1 00 00 48 | DB 00 68 88 | AD 00 00 20 | 84 00 00 4D | 5A 00 68 D9 | 31 00 00 21 |
| 0080F4 | 1D 00 00 4E | 12 00 68 FA | 4E 00 00 21 | 42 00 00 50 | 24 00 69 18 | 90 00 00 24 | 0D 00 00 54 |
| 008110 | 2D 00 69 3F | 9D 00 00 24 | 35 00 00 54 | C1 00 69 63 | D2 00 00 23 | 84 00 00 50 | E7 00 69 87 |
| 00812C | 56 00 00 28 | 00 AA 55 41 | BE 00 69 AF | 7A 00 00 22 | CD 00 6A 13 | D6 00 69 D2 | 47 00 00 21 |
| 008148 | 3E 00 00 52 | CF 00 69 F3 | 85 00 00 1F | F3 00 00 48 | C0 00 6A 13 | 78 00 08 22 | 11 00 00 51 |
| 008164 | FD 00 6A 35 | 83 00 00 22 | 90 00 00 51 | 68 00 6A 58 | 19 00 00 22 | 7C 00 00 50 | 91 00 6A 7A |
| 008180 | 95 00 00 24 | F0 00 00 55 | 9D 00 00 00 | 00 78 9C BC | 7D 0D 7C 54 | C5 D5 F7 DC | FD CA 26 04 |

305 ─── 715

Fortified Firmware

| | | | | | |
|---|---|---|---|---|---|
| 008068 | 11 00 00 20 | E0 00 00 4D | 3C 00 67 D4 | F1 00 00 21 | 86 00 00 50 | 91 00 67 F6 | 77 00 00 20 |
| 008084 | FD 00 6A 35 | 89 00 00 22 | 90 00 00 51 | 68 00 6A 58 | 19 00 00 22 | 7C 00 00 50 | 91 00 6A 7A |
| 0080A0 | 28 00 00 4D | AA 00 68 16 | 9F 00 00 20 | BC 00 00 50 | 0C 00 68 37 | 58 00 00 20 | CB 00 00 4C |
| 0080BC | C4 00 68 58 | 26 00 00 20 | 83 00 00 4D | BF 00 68 78 | A9 00 00 20 | 23 00 00 48 | 2A 00 68 98 |
| 008308 | CC 00 00 1F | E1 00 00 48 | DB 00 68 88 | AD 00 00 20 | 84 00 00 4D | 5A 00 68 D9 | 31 00 00 21 |
| 0080F4 | 1D 00 00 4E | 12 00 68 FA | 4E 00 00 21 | 42 00 00 50 | 24 00 69 18 | 90 00 00 24 | 0D 00 00 54 |
| 008110 | 2D 00 69 3F | 9D 00 00 24 | 54 00 00 54 | C1 00 69 63 | D2 00 00 23 | 90 00 00 00 | E7 00 69 87 |
| 00812C | 00 00 79 00 | 00 AA 55 41 | BE 00 69 AF | 20 00 67 82 | F1 00 E2 17 | CD 00 00 50 | 00 00 67 84 |
| 008148 | 56 00 00 28 | 24 00 07 A | 7A 00 00 22 | 7A 00 00 22 | CD 00 6A 13 | D6 00 69 D2 | 47 00 00 21 |
| 008164 | 3E 00 00 52 | CF 00 69 F3 | 85 00 00 1F | F3 00 00 48 | C0 00 6A 13 | 78 00 00 22 | 11 00 00 51 |
| 008180 | 95 00 00 24 | F0 00 00 55 | 9D 00 00 00 | 00 78 9C BC | 7D 0D 7C 54 | C5 D5 F7 DC | FD CA 26 04 |

METHODS, SYSTEMS, AND MEDIA FOR INHIBITING ATTACKS ON EMBEDDED DEVICES

CROSS REFERENCE TO RELATED APPLICATIONS

This application is a continuation of U.S. patent application Ser. No. 14/379,166, filed Aug. 15, 2014, which is the United States National Phase Application under 35 U.S.C. § 371 of International Application No. PCT/US2013/026529, filed Feb. 15, 2013, which claims the benefit of U.S. Provisional Patent Application No. 61/599,377, filed Feb. 15, 2012, U.S. Provisional Patent Application No. 61/602,061, filed Feb. 22, 2012, and U.S. Patent Application No. 61/765,646, filed Feb. 15, 2013, each of which are hereby incorporated by reference herein in their entireties.

This application relates to U.S. patent application Ser. No. 12/765,814, filed Apr. 22, 2010, which is hereby incorporated by reference herein in its entirety.

STATEMENT REGARDING FEDERALLY SPONSORED RESEARCH OR DEVELOPMENT

The invention was made with government support under Grants FA8750-10-2-0253, FA8750-09-1-0075, and FA8650-10-C-7024 awarded by the Air Force Research Laboratory. The government has certain rights in the invention.

TECHNICAL FIELD

The disclosed subject matter relates to methods, systems, and media for inhibiting attacks on embedded devices.

BACKGROUND

Attackers routinely exploit vulnerabilities in computer systems to inject malicious code. For example, attackers can gain access to an internal network with the use of spyware or rootkits. Such software can be easily installed on computer systems from physical or digital media (e.g., email, downloads, etc.) and can provide these attackers with administrator or "root" access on a machine along with the capability of gathering sensitive data. In particular, attackers can snoop or eavesdrop on a computer or a network, download and exfiltrate data, steal assets and information, destroy critical assets and information, and/or modify information. Rootkits have the ability to conceal themselves and elude detection, especially when the rootkit is previously unknown, as is the case with zero-day attacks.

Embedded devices, such as routers, switches, voice over IP (VOIP) adapters, virtual private network (VPN) devices, and firewalls, exist in large numbers within global IT environments and critical communication infrastructures. In fact, these embedded devices constitute the majority of the network infrastructure that forms the Internet. Similarly, embedded devices can include special-purpose appliances, such as printers, wireless access points, Internet Protocol (IP) phones, and other similar appliances, that are now commonplace in the modern home and office. These devices are typically built with general purpose, real-time embedded operating systems using stock components and are capable of interacting with general purpose computers. It is often thought that the diverse and proprietary nature of embedded device hardware and firmware creates a deterrent against effective widespread exploitation of security vulnerabilities in these devices. In that regard, embedded device manufacturers for the most part passively rely on obscurity to resist hacking attempts and other security breaches.

Nevertheless, attackers have the capability to attack these embedded devices. A network of computers that has been infected with malicious code, where each infected computer can be controlled by an attacker often without knowledge of the infected computer's owner is generally referred to as a hornet and these networked embedded devices can be used in botnets. For example, networked embedded devices can be compromised using out-of-the-box default passwords and used in botnets, where, in many instances, embedded devices are the core communication components of a networked system. In addition, these attackers are likely to possess information about the firmware running, on an embedded device, and thus may be equipped to devise corresponding rootkits and other malware.

In response to these threats, many computers are protected by antivirus software and/or firewalls. However, these preventative measures are not always adequate. In particular, traditional antivirus software does not work on embedded devices and, generally speaking, these embedded devices are not built with security in mind. Moreover, the code or firmware on these embedded devices is often proprietary and undisclosed to third parties. Accordingly, updating and modifying device firmware for different embedded devices is a difficult task.

Accordingly, there is a need for inhibiting attacks on embedded devices.

SUMMARY

In accordance with various embodiments, mechanisms for inhibiting attacks on embedded devices are provided.

In some embodiments, mechanisms are provided for injecting code written in high level programming languages into embedded devices, such as routers, access points, modems, webcams, printers, conferencing units, VOIP adapters, VPN devices, military weapon systems, supervisory control and data acquisition (SCADA) control and/or management systems, programmable logic controller (PLC) systems, and/or any other suitable device. Once the code is injected into the embedded device, the injected code analyzes and modifies the code of the embedded device (e.g., firmware) to create the execution environment for the injected code. The firmware or code can by fortified by automatic binary reduction and/or binary structure randomization approaches.

It should be noted that these mechanisms modify the code or firmware of the embedded device without reliance upon the source code. For example, the code of the embedded device is injected and modified without prior knowledge of function entry points or other memory information in the embedded device. It should also be noted that these mechanisms modify the code of the embedded device without altering the behavior of the embedded device. For example, in some embodiments, the modified or fortified firmware can operate along with the host program, where computation resources of the embedded device can be allocated to execute the host program and the fortified firmware e.g., including its intrusion detection mechanisms).

Methods, systems, and media for inhibiting attacks on embedded devices are provided. In some embodiments, a system for inhibiting attacks on embedded device is provided, the system comprising a processor that is configured to: identify an embedded device that is configured to provide one or more services to one or more digital processing devices within a communications network; receive a first firmware associated with the embedded device; generate a second firmware that is functionally equivalent to the first firmware by: determining unused code within the first firmware; removing the unused code within the second firmware to create free memory locations; and using the free memory locations to restructure remaining program instructions from the first firmware into memory positions within the second firmware and insert at least one defensive payload and at least one policy; and inject the second firmware into the embedded device.

In some embodiments, a method for inhibiting attacks on embedded devices is provided. The method comprises: identifying an embedded device that is configured to provide one or more services to one or more digital processing devices within a communications network; receiving a first firmware associated with the embedded device; generating a second firmware that is functionally equivalent to the first firmware by: determining unused code within the first firmware; removing the unused code within the second firmware to create free memory locations; and using the free memory locations to restructure remaining program instructions from the first firmware into memory positions within the second firmware and insert at least one defensive payload and at least one policy; and injecting the second firmware into the embedded device.

In some embodiments, a non-transitory computer-readable medium containing computer-executable instructions that, when executed by a processor, cause the processor to perform a method for inhibiting, attacks on embedded devices, is provided. The method comprises: identifying an embedded device that is configured to provide one or more services to one or more digital processing devices within a communications network; receiving a first firmware associated with the embedded device; generating a second firmware that is functionally equivalent to the first firmware by: determining unused code within the first firmware; removing the unused code within the second firmware to create free memory locations; and using the free memory locations to restructure remaining program instructions from the first firmware into memory positions within the second firmware and insert at least one defensive payload and at least one policy; and injecting the second firmware into the embedded device.

BRIEF DESCRIPTION OF THE DRAWINGS

FIG. 6B shows an illustrative example of original firmware associated with an embedded device and an illustrative example of fortified firmware of FIG. 3 in accordance with some embodiments of the disclosed subject matter.

FIG. 7B shows an illustrative example of original firmware associated with an embedded device and an illustrative example of fortified firmware that includes relocated code in accordance with some embodiments of the disclosed subject matter.

DETAILED DESCRIPTION

Figure 1A:
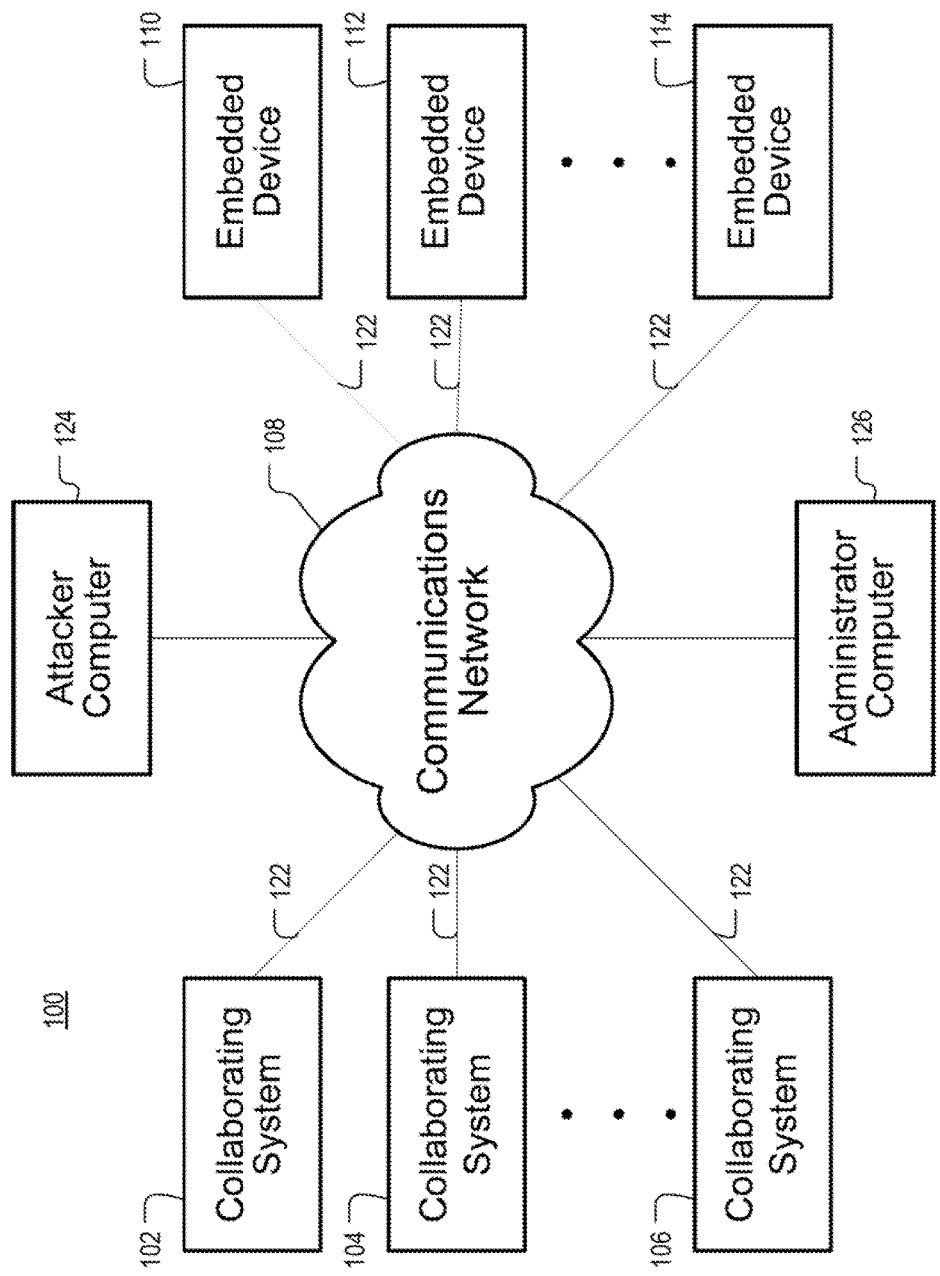
FIG. 1A is a schematic diagram of an illustrative system suitable for implementation of mechanisms for inhibiting attacks on embedded devices in accordance with some embodiments of the disclosed subject matter.

In accordance with some embodiments, mechanisms for inhibiting attacks on embedded devices are provided. As used herein, embedded devices can include routers, access points, modems, webcams, printers, conferencing units, VOIP adapters, VPN devices, IP phones, home appliances, television sets, streaming players, and/or any other suitable devices. For example, embedded device can also include military weapon systems, supervisory control and data acquisition (SCADA) control and/or management systems, programmable logic controller (PLC) systems. These mechanisms can generally include injecting, host-based defenses into an arbitrary host program running on an embedded device. Such embedded devices that include the injected host-based defenses are sometimes referred to herein as a "symbiotic embedded device," a "symbiotic embedded machine," a "symbiote," a "parasitic embedded machine," or a "monitoring machine."

In some embodiments, the injected host-based defenses can execute alongside the firmware or host program associated with the embedded device. For example, the injected intrusion detection application can monitor the firmware and detect the unauthorized modification of the firmware associated with the embedded device. In another example, the injected intrusion detection application can determine if an unauthorized party attempts to disable, interfere with, or otherwise modify the firmware associated with the embedded device. In addition, it can be determined whether the unauthorized party attempts to disable, interfere with, or otherwise modify the injected host-based defenses. By monitoring the execution and integrity of the firmware or host program, the injected intrusion detection application can fortify the embedded device against exploitation.

In some embodiments, adaptation, randomization, and/or polymorphic mutation approaches can be applied to the host program of the embedded device and/or the injected intrusion detection application. For example, in some embodiments, in response to obtaining an arbitrary executable or a firmware image as an input, a modified version of the firmware image can be generated. In a more particular example, the modified version of the firmware image can be a hardened, functionally equivalent, variant of the original firmware image. This can include, for example, determining and removing unused portions of code (e.g., determined by the particular configuration state of the embedded device) to reduce the potential vulnerable attack surface. Using this free space, the remaining, executable portions of the firmware image can be restructured into randomized, functionally equivalent, binary images. Additionally or alternatively, the randomization operation can be performed by breaking apart basic blocks of code of the original firmware and then relocating them into randomly selected positions in the resultant fortified firmware image.

In some embodiments, the fortified firmware injected into an embedded device can include a monitoring machine. The monitoring machine can include features for intrusion detection and/or prevention. Injecting such a monitoring machine can involve modifying the code of the original firmware to create an execution environment for the injected code. For example, the monitoring machine or any other suitable component can determine and select function entry points, return instructions, program instruction locations, and/or other locations in the code and reallocate the system resources (e.g., processing and/or memory resources) such that the monitoring machine can execute in a time-shared fashion concurrently with the code of the embedded device. This can, for example, facilitate repeated executions of the monitoring machine without otherwise altering the behavior of the embedded device. It should be noted that, as the monitoring machine may not use third-party code (e.g., firmware code, operating system code, and/or other code provided by the manufacturer of an embedded device), the monitoring machine may be agnostic with respect to the operating environment.

It should be noted that, in some embodiments, the defensive mechanisms can be a self-contained execution environment that is injected into the host program. It should also be noted that, in some embodiments, the defensive mechanisms cannot be modified or disabled by unauthorized parties through online or offline attacks. It should further be noted that, in some embodiments, the defensive mechanisms can have visibility into the code and execution state of the host program and can passively monitor or actively react to observed events (e.g., malicious code that attempts to modify the firmware of an embedded device cannot detect the defensive mechanisms, but the defensive mechanisms can detect the malicious code).

These mechanisms can be used in a variety of applications. For example, these mechanisms provide the opportunity to upgrade and enhance deployed or existing devices (each having different firmware) with security features to protect those devices from attacks designed for nefarious purposes. In another example, these mechanisms can be used to retrofit a variety of embedded devices with detection and/or security applications (e.g., antivirus applications, intrusion detection systems, etc.). In a more particular example, a rootkit detector can be injected into a router, where the detector continuously verifies the integrity of the running code of the router.

Turning to FIG. 1A, an example of a system 100 in which firmware fortification mechanisms can be implemented is shown. As illustrated, system 100 includes multiple collaborating computer systems 102, 104, and 106, a communication network 108, a networked embedded device 110, communication links 122, an attacker computer 124, and administrator computer 126.

Collaborating systems 102, 104, and 106 can be systems owned, operated, and/or used by universities, businesses, governments, non-profit organizations, families, individuals, and/or any other suitable person and/or entity. Collaborating systems 102, 104, and 106 can include any number of user computers, servers, firewalls, routers, switches, gateways, wireless networks, wired networks, intrusion detection systems, and any other suitable devices. In addition, collaborating systems 102, 104, and 106 can include one or more processors, such as a general-purpose computer, a special-purpose computer, a digital processing device, a server, a workstation, and/or various other suitable devices. Collaborating systems 102, 104, and 106 can run programs, such as operating systems (OS), software applications, a library of functions and/or procedures, background daemon processes, and/or various other suitable programs. In some embodiments, collaborating systems 102, 104, and 106 can support one or more virtual machines. Any number (including only one) of collaborating systems 102, 104, and 106 can be present in network 100, and collaborating systems 102, 104, and 106 can be identical or different. For example, collaborating systems 102, 104, and/or 106 can be connected to networked embedded devices 110, 112, and 114.

As used herein, embedded devices 110, 112, and 114 can be any number of routers, switches, gateways, webcams, gaming systems, input devices, imaging devices, conferencing units, communications devices, VPN devices, VOIP adapters, printers, military weapon systems, supervisory control and data acquisition (SCADA) control and/or management systems, programmable logic controller (PLC) systems, as well as any other suitable types of devices. In a more particular example, embedded device 110 can be a Microprocessor without Interlocked Pipeline Stages (MIPS)-based embedded device, a PowerPC-based embedded device, or an ARM-based embedded device, such as a Cisco Systems router or a Linksys router. It should be noted that any number of embedded devices can be present in network 100, but only three are shown in FIG. 1 to avoid overcomplicating the drawing. It should also be noted that each embedded device 110, 112, and 114 can include code, such as firmware, that runs on the respective embedded device 110, 112, and 114. In some embodiments, the code on the embedded device 110, 112, and/or 114 can be proprietary such that function entry points, function or library routine return instruction locations, memory locations, etc. in the embedded device 110 are unknown. It should further be noted that the code on one embedded device can be different from the code on another embedded device based on, for example, the manufacturer of the embedded device, the type of the embedded device, the model of embedded device, etc.

Communication network 108 can be any suitable network for facilitating communication among computers, servers, embedded devices, etc. For example, communication network 108 can include private computer networks, public computer networks (such as the Internet), telephone communication systems, cable television systems, satellite communication systems, wireless communication systems, any other suitable networks or systems, and/or any combination of such networks and/or systems. In some embodiments, an attacker using attacker computer 124 can obtain internal network access. For example, using spyware or rootkits, attackers can gain access to communications network 108 by breaking into embedded devices on the network, such as embedded devices 110, 112, and 114. Such software can feasibly be installed on embedded devices to give the attacker access to other machines on the network along with the capability of gathering sensitive data. Generally, owners of embedded devices do not closely monitor the states of their embedded devices, and thus successful hacking attacks against embedded devices can easily go undetected.

Communication links 122 can be any suitable mechanism for connecting collaborating systems 102, 104, and/or 106, embedded device or devices 110, 112, and/or 114, and attacking computer system 124 to communication network 108. Links 122 can be any suitable wired or wireless communication link, such as a T1 or T3 connection, a cable modem connection, a digital subscriber line connection, a Wi-Fi or 802.11(a), (b), (g), or (n) connection, a dial-up connection, and/or any other suitable communication link. Alternatively, communication links 122 can be omitted from network 100 when appropriate, in which case systems 102, 104, and/or 106 and embedded device 110, 112, and/or 114 can be connected directly to communication network 108.

Figure 1B:
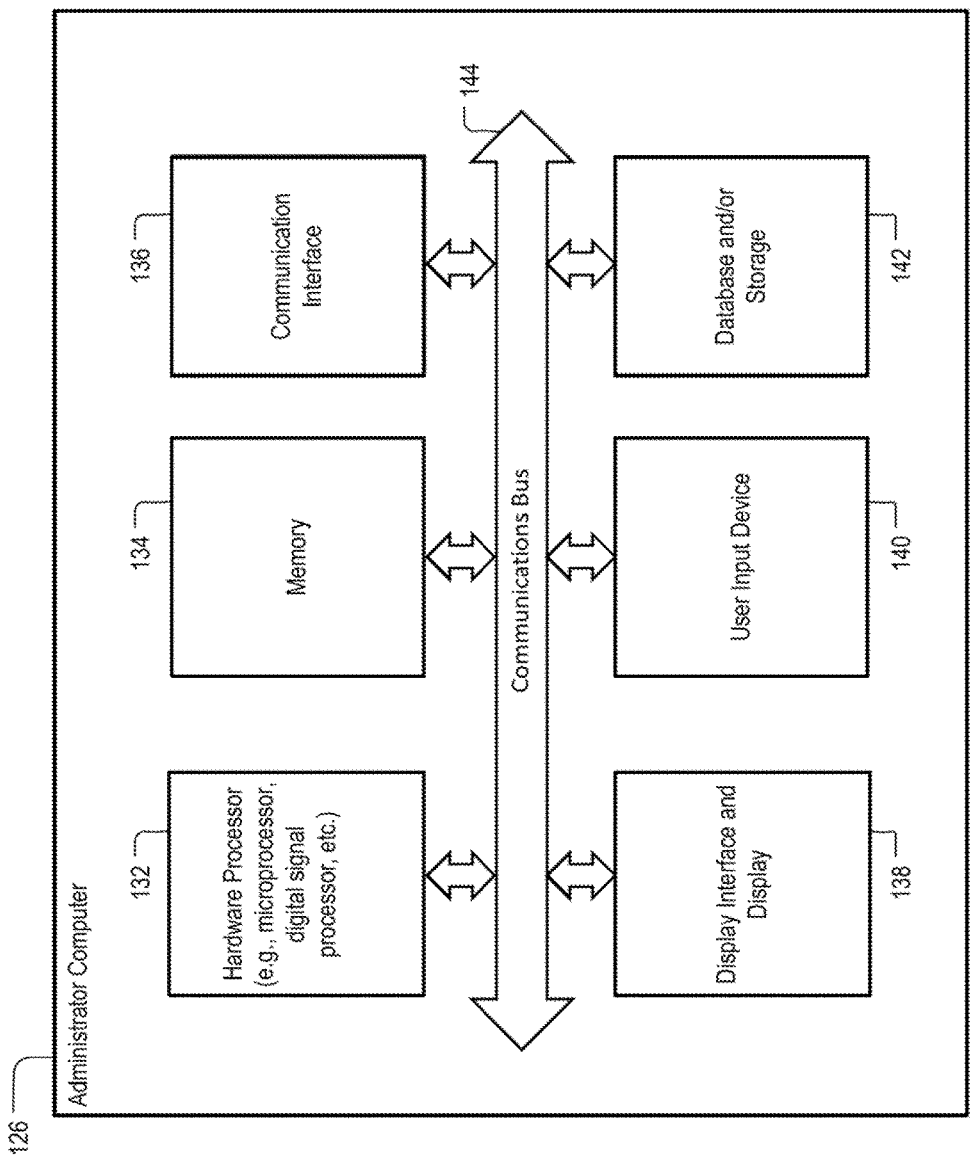
FIG. 1B shows a detailed example of an administrator computer that can be used to implement mechanisms for inhibiting attacks on embedded devices in accordance with some embodiments of the disclosed subject matter.

Administrator computer 126 can be a desktop computer, laptop, tablet, smartphone, cellphone, or any other suitable computing device. In particular, FIG. 1B depicts an example diagram of the structure of administrator computer 126. As illustrated, administrator computer 126 can include any suitable components such as a hardware processor 132 (which can be a microprocessor, digital signal processor, a controller, etc.), memory 134, communication interface 136, a display interface and display 138, user input device 140, a database and/or storage 142, a communications bus 144, etc.

Figure 5:
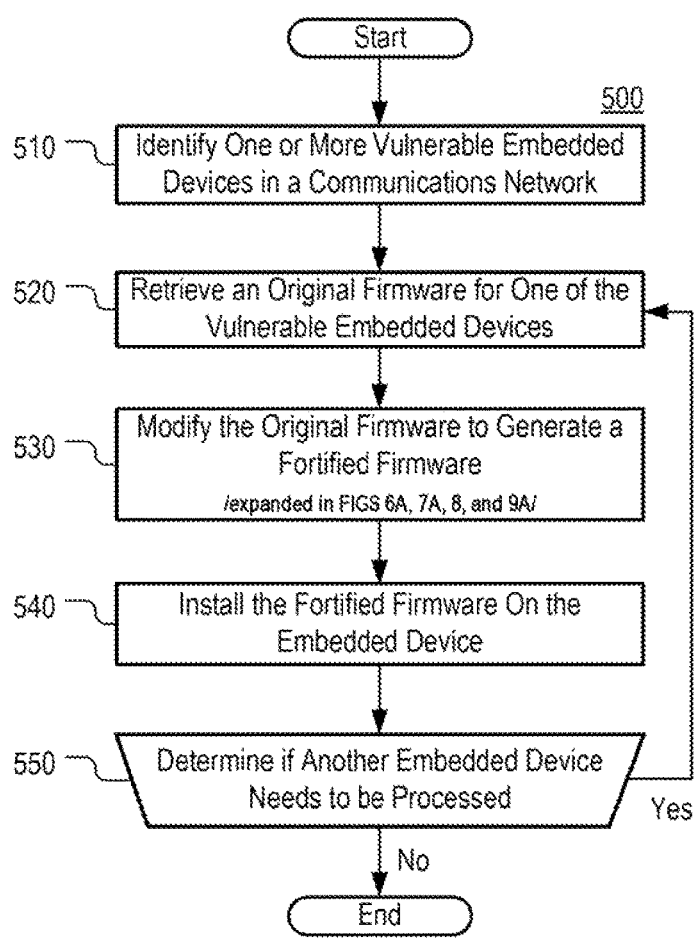
FIG. 5 is a flowchart of an illustrative process for generating and configuring fortified firmware on an embedded device in accordance with some embodiments of the disclosed subject matter.

In some embodiments, administrator computer 126, or processor 132, can be configured to generate a fortified firmware that can protect at least one of embedded devices 110, 112, and/or 114 against attacks or exploitation. Additionally or alternatively, administrator computer 126, or processor 132, can be configured to receive an indication of intrusion on one of the embedded devices 110, 112, and 114. Such indication can be generated when malicious code attempts to overwrite a particular memory address in the embedded device, or disable intrusion detection software (e.g., monitoring machine) that is part of the fortified firmware that has been installed on that embedded device. By way of example, administrator computer can perform one or more of the steps discussed with respect to process 500 that is shown in FIG. 5.

Figure 2:
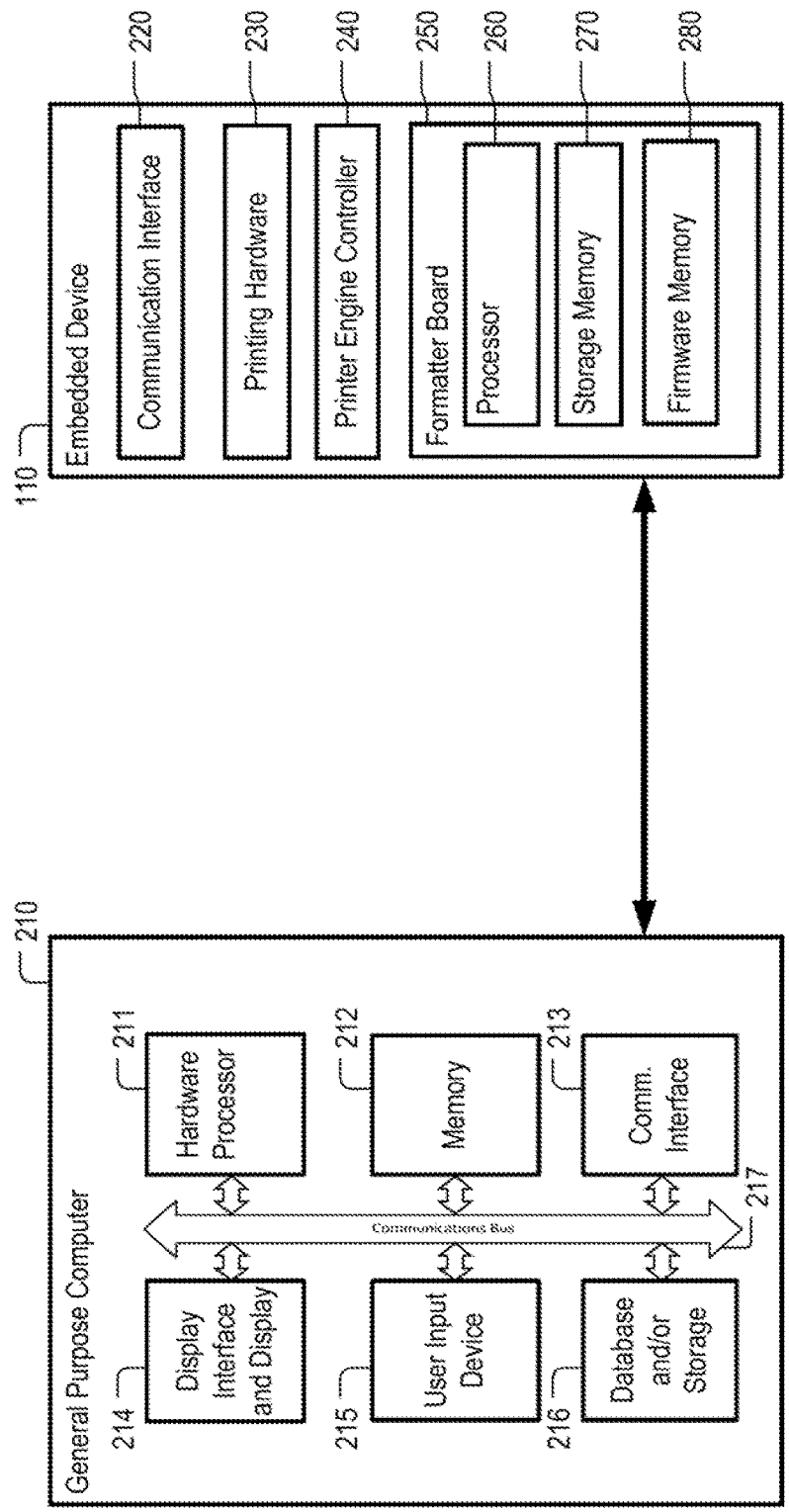
FIG. 2 shows an illustrative example of a general purpose computer and an illustrative example of an embedded device in accordance with some embodiments of the disclosed subject matter.

FIG. 2 shows an example diagram depicting general-purpose computer 210 and embedded device 110 in accordance with some embodiments of the disclosed subject matter. General purpose computer 210 can be any general purpose computer, such as a laptop or desktop. General purpose computer can be part of any one of collaboration systems 102, 104, and 106 and it can be connected to embedded device 110 via one or more communications networks, such as network 108. General purpose computer 210 can include any suitable components such as a hardware processor 211 (which can be a microprocessor, digital signal processor, a controller, etc.), memory 212, communication interface 213, a display interface and display 214, user input device 215, a database and/or storage 216, a communications bus 217, etc.

Moreover in some embodiments, any suitable computer readable media can be used for storing instructions for performing the processes described herein. For example, in some embodiments, computer readable media can be transitory or non-transitory. For example, non-transitory computer readable media can include media such as magnetic media such as hard disks, floppy disks, etc.), optical media (such as compact discs, digital video discs. Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

As noted above, in some embodiments, embedded device 110 can be a consumer appliance, such as a smart thermostat, refrigerator, TV set, DVD player, streaming player, digital cameras, or another suitable device. Additionally or alternatively, in some embodiments, embedded device can be any suitable embedded device that is configured to provide, at least in part, a service to general-purpose computer 210. For example, embedded device can be any suitable network infrastructure component, such as a switch, router, network switch, gateway, or another suitable network component that provides, at least in part, general-purpose computer 210 with network connectivity. Additionally or alternatively, in some embodiments, embedded device can be an input/output (I/O) device, such as a webcam, scanner, printer, or another suitable peripheral device.

It should be noted that, in some embodiments, embedded device 110 can be network-enabled. That is, embedded device 110 can include hardware and/or software that allows embedded device 110 to connect to a local area network, the Internet, or any suitable type of communications network. As shown in the example of FIG. 2, embedded device 110 is a network-enabled printer.

As also shown in FIG. 2, embedded device 110 can include any suitable components, such as communication interface 220, printing hardware 230, printer engine controller 240, and formatter board 250. Communication interface 220 can include a USB interface, a serial interface, a WiFi interface, an Ethernet interface, a 3G interface, a Bluetooth interface, or any other suitable interface. Printing hardware 230 can include rollers, actuators, paper trays, drums, fuser, and/or other mechanical or electro-mechanical components typically found in printers. Printer engine controller 240 can include integrated circuits (e.g., system on a chip, memory or processor) and/or software for controlling the operation of printing hardware 230. Thus, in some embodiments, print engine controller 240 can implement low-level logic that switches on and off the rollers, drum, and fuser in printing hardware 230. Formatter hoard 250 can include hardware and/or software for controlling all other aspects of the operation of embedded device 110 that are not controlled by print engine controller 240 and it can include any suitable components, such as processor 260, storage memory 270, and firmware memory 280. Although in this example formatter board 250 shares control over embedded device 210 with printer engine controller 240, in other examples formatter board 250 can have full control over all aspects of the operation the embedded device, in such examples, embedded device can be lacking a printer engine controller or other hardware that is specific to the context of printing and printers.

Processor 260 can include one or more general purpose, or special purpose, hardware processors, such as MIPS PowerPC, or ARM. Storage memory 270 can include any volatile or non-volatile memory that is modifiable by the user. Storage memory 270 can include RAM, flash memory, hard drive, or any other suitable type of memory. Firmware memory 280 can be a flash ROM chip, or another similar device. Firmware memory 280 can be used to store the firmware of embedded device 110. The firmware can include processor executable instructions, which when executed cause embedded device 110, to perform its core functionality (e.g., printing in this example, taking pictures when the embedded device is a camera device, playing media content when the embedded device 110 is a media player or a television device, routing network packets when the embedded device 110 is a router, etc.). Although in this example, storage memory 270 and firmware memory 280 are depicted as discrete units, in other examples they can be located on the same hardware module and separated logically. Additionally or alternatively, in some embodiments, embedded device 110 can include only one type of memory that can be used to store all types of data utilized by the embedded device, including the embedded device's firmware.

In some embodiments, embedded device 110 can be configured in such a way that the content of firmware memory 280 may be inaccessible to the use of the device. Unlike storage memory 270, firmware memory 280 may not be modifiable during the device's normal operation. In such embodiments, the content of firmware memory 280 can be updated using a firmware update procedure. During this procedure, the content of firmware memory 280 can be erased, or overwritten, with a new firmware image. In some embodiments, the firmware image can be an archive file composed of every sector of firmware memory 280 (e.g., written sectors only or both written sectors and empty sectors). Additionally or alternatively, in some embodiments, the firmware image can be any suitable firmware update file that can be used as a basis for overwriting firmware memory 280. It should be noted that firmware and firmware image may be used interchangeably.

Embedded device 110 can be susceptible to firmware substitution attacks. Such attacks can result in the original firmware of embedded device 110 being substituted with a firmware that is infected with malicious code. The malicious code can allow hackers to gain access to network 108 or to information that is being printed by embedded device 110. The only symptom of a firmware substitution attack may be the device becoming unavailable for a particular time period (e.g., one minute) while the attack is performed. In that regard, and because embedded devices are often not carefully monitored by system administrators, firmware substitution attacks may very easily go undetected. To prevent such attacks, an original firmware for embedded device 110 can be fortified using one or more of the approaches discussed herein. Fortifying the firmware can include generating a fortified firmware image that differs from the original firmware, but is functionally equivalent to the original firmware. As discussed, the fortified firmware is less susceptible to hacking attacks than the original firmware.

Figure 3:
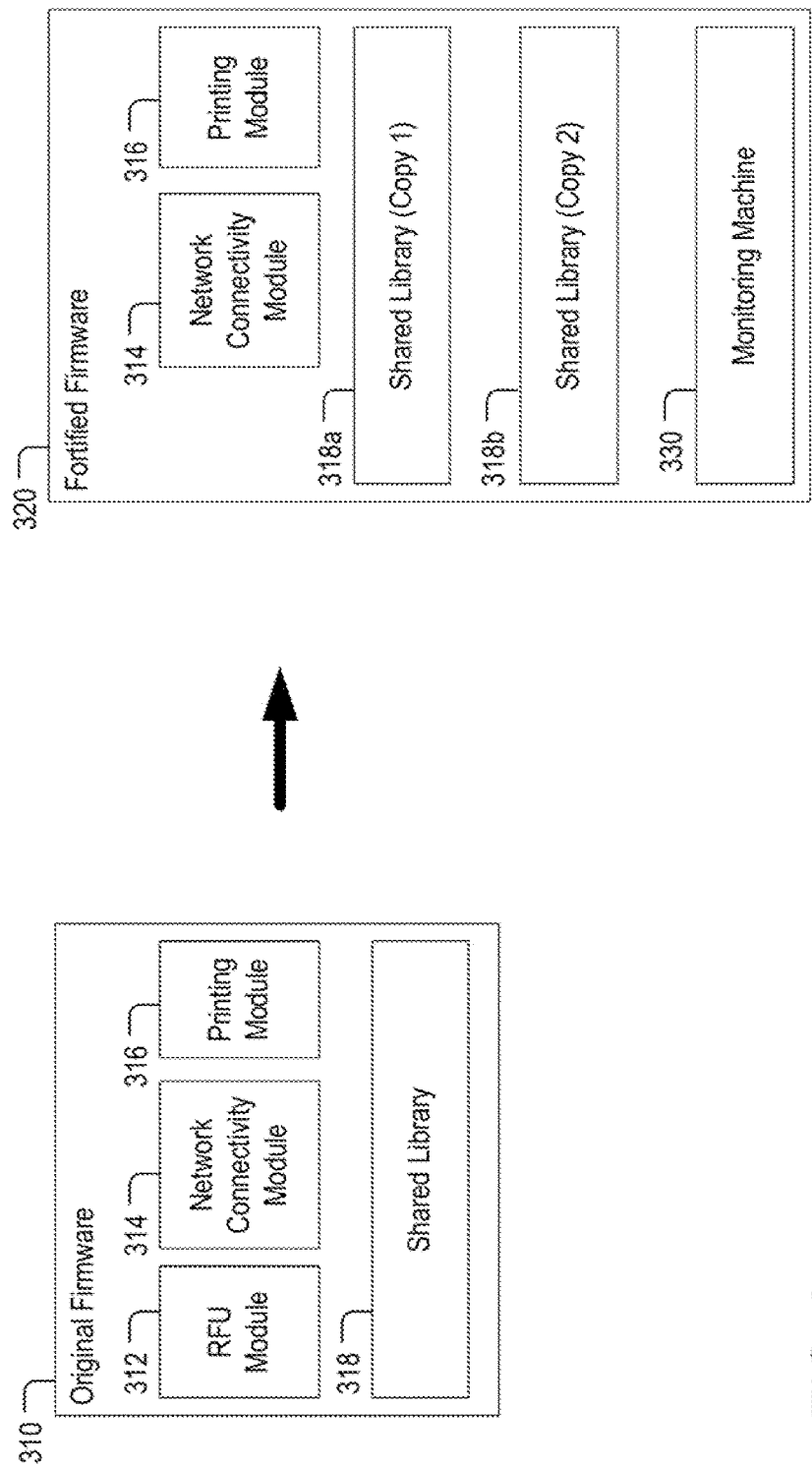
FIG. 3 shows an illustrative example of original firmware associated with an embedded device and an illustrative example of fortified firmware in accordance with some embodiments of the disclosed subject matter.

FIG. 3 includes an example of original firmware and an example of fortified firmware for embedded device 110 in accordance with some embodiments of the disclosed subject matter. Both original firmware 310 and fortified firmware 320 can be firmware images that include instructions, such as machine language instructions. As illustrated, the original firmware can include remote firmware update (RFU) module 312, network connectivity module 314, printing module 316, and shared library 318. RFU module 312 can include a plurality of instructions for updating the firmware of embedded device 110 remotely, which, when executed by processor 260, can cause the processor to accept and execute firmware update instructions received over network 108. More particularly, RFU module 312 can be used by an attacker (e.g., attacker computer 124) to mount a firmware substitution attack. Network connectivity module 314 can include instructions, which when executed by processor 260, can cause the processor to receive messages (e.g. print jobs, update requests, pings, etc.) over network 212. Printing module 316 can include instructions that, when executed by processor 260, can cause processor 260 to feed information that is to be printed to printer engine controller 240. In this example, modules 312, 314, and 316 do not share any code. By contrast, shared library 318 can include processor-executable instructions that could potentially be invoked by both network connectivity module 314 and printing module 316.

Figure 4:
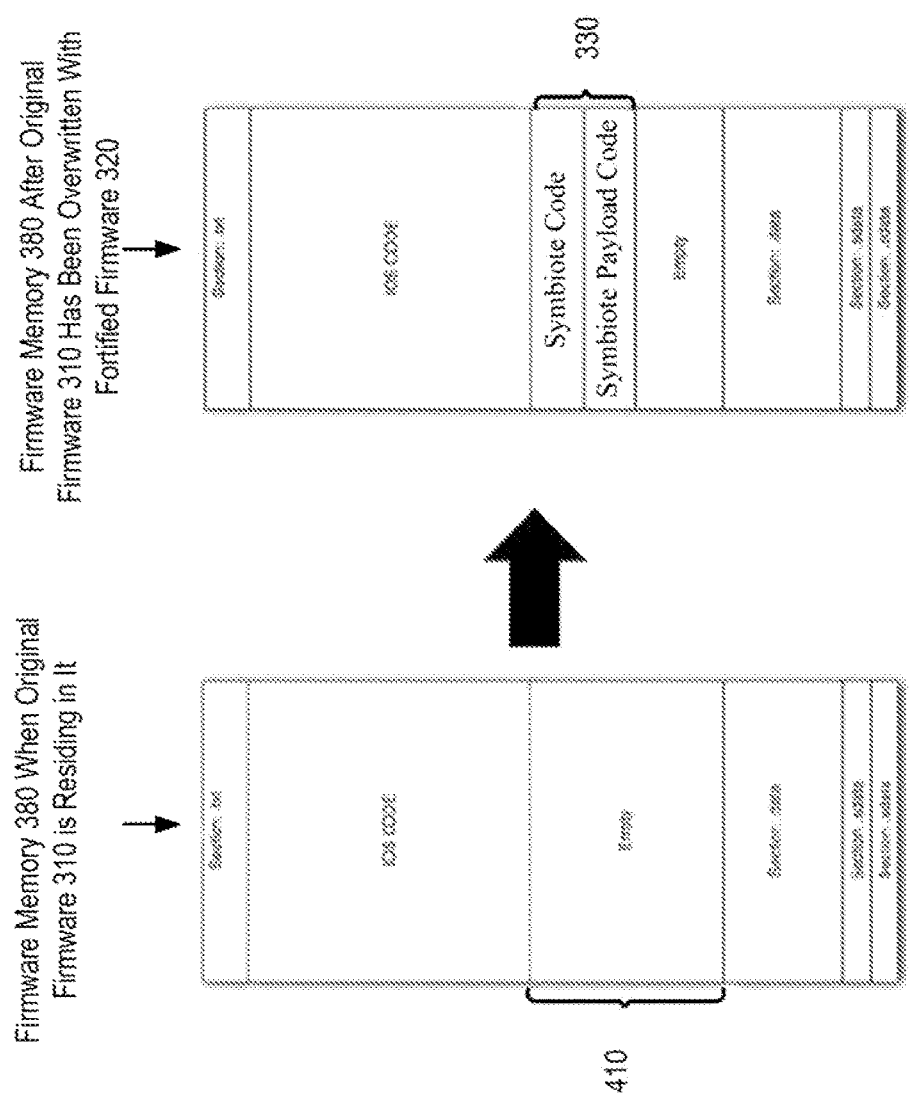
FIG. 4 shows an illustrative example of the memory content of the embedded device of FIG. 2 in accordance with some embodiments of the disclosed subject matter.

Similar to original firmware 310, fortified firmware 320 can also include network connectivity module 314 and printing module 316. However, RFU module 312 may be designated as not to be included in fortified firmware 320 because, as noted above, RFU module 312 can be used to mount firmware substitution attacks on embedded device 110. In addition, in fortified firmware 320, shared library 318 can be replaced by copies 318a and 318b of shared library 318. In some embodiments, copy 318a of shared library 318 can be assigned to network connectivity module 314 and copy 318b can be assigned to printing module 316. Thus, unlike shared library 318, copies 318a and 318b of the shared library may not be shared among multiple modules of the embedded device. In addition, fortified firmware 320 can include a monitoring machine 330. Monitoring machine 330 can be configured to prevent or detect the execution of malicious code on embedded device 110. As illustrated in FIG. 4, when fortified firmware 320 is installed on an embedded device, monitoring machine 330 can occupy portion 410 of firmware memory 380 that is empty when original firmware 310 is used on the embedded device. More particularly, code injected into the embedded device can be allocated a small portion of unused memory on the embedded device (e.g., unused portion of memory 410 in FIG. 4). Within this portion of unused memory, the payload execution code can embed both the payload execution environment and the target code within memory portion 420. The remaining portion of unused memory can be used for storing execution contexts of the injected payload.

FIG. 5 illustrates an example of a process 500 for configuring embedded device 110 in accordance with some embodiments of the disclosed subject matter. At 510, one or more vulnerable embedded devices in network 100 can be identified. In some embodiments, identifying the one or more of the devices can include retrieving, by the processor executing process 500, an identifier(s) for the devices from memory and/or receiving the identifier as user input. Additionally or alternatively, the devices can be identified automatically using administrator computer 126 by scanning network 108 and fingerprinting various embedded devices that are found in the network. Fingerprinting the embedded devices can involve transmitting messages to the embedded devices, receiving responses to the messages, and processing the responses to determine one or more device characteristics, such as the type of each device (e.g., a router, a printer, a scanner, a media playback device, a telephone device, etc.), the operating system executing on the device (e.g., iOS, Vware, etc.), the type of processor used on each device, or any other suitable characteristic. In some embodiments, once multiple devices in network 100 are fingerprinted, the information obtained as a result of the fingerprinting can be compared to a list of devices that are known to be vulnerable, thereby identifying those fingerprinted devices that are potentially threatened by hacking attacks. In this example, embedded device 110 is identified as a vulnerable embedded device.

At 520, original firmware 310 for embedded device 110 is retrieved from a memory. It should be noted, that although the embodiments described herein generally relate to obtaining original firmware associated with an embedded device and fortifying the firmware with security features, such as intrusion detection mechanisms and code modification detection mechanisms, this is merely illustrative. For example, multiple executable files associated with the embedded device can be retrieved and modified to incorporate security features.

At 530, the original firmware is modified to generate fortified firmware 320. Modifying original firmware 310 can include one or more of:

M1: deleting code from original firmware 310;
M2: mutating original firmware 310;
M3: inflating original firmware 310;
M4 injecting, a monitoring machine (MM) into original firmware 310; and
M5: any suitable combination of M1, M2, M3, and M4.

It should be noted that certain rootkit attacks on original firmware 310 can involve patching specific instructions in original firmware 310 in order to create a bidden backdoor in the firmware. In that regard, executing modifications M1 and/or M2 can change the structure and/or topology of original firmware 310, thereby making it increasingly difficult for hackers to ascertain the memory addresses that can be patched. Modification M3, similarly, can increase the size of the firmware of embedded device 110, thereby causing it to occupy any empty space or unused memory where malicious code can be stored. Modification M4 can introduce an active defensive measure for detecting such attacks into the software environment of embedded device 110. As further discussed below, the monitoring machine installed as part of modification M4 can detect when specific memory locations are overwritten by a root kit and can generate an alarm or any other suitable alert.

At 540, fortified firmware 320 can be installed or otherwise executed on embedded device 110. In some embodiments, installing fortified firmware 320 can include flashing firmware memory 280. In some embodiments, fortified firmware 320 can be installed on embedded device 110 by using a remote firmware update feature that is present on embedded device 110. At 550, a determination can be made if there is another one of the devices identified at step 510 that remains to be processed. If there is another device, process 500 can return to 520, where 520, 530, and 540 are executed for another vulnerable embedded device.

In some embodiments, administrator computer 126, or more specifically by processor 132 of the administrator computer, can perform at least one of 510, 520, 530, 540, and/or 550. Additionally or alternatively, in some embodiments, at least one of 510, 520, 530, 540, and/or 550 of process 500 can be performed by embedded device 110, or more specifically by processor 260 of the embedded device. In particular, one or more of 520, 530, and/or 540 can be performed by embedded device 110. For example, one or more of modifications M1-M5 can be performed by embedded device 110 at runtime. In such embodiments, modification M1-M4 can be performed in accordance with a predetermined schedule, such as when embedded device 110 is booted or every n times the embedded device is booted. In that regard, by performing modifications M1-M4 repeatedly, embedded device 110 can turn itself into a moving target for malicious code designers and other potential attackers.

Figure 6A:
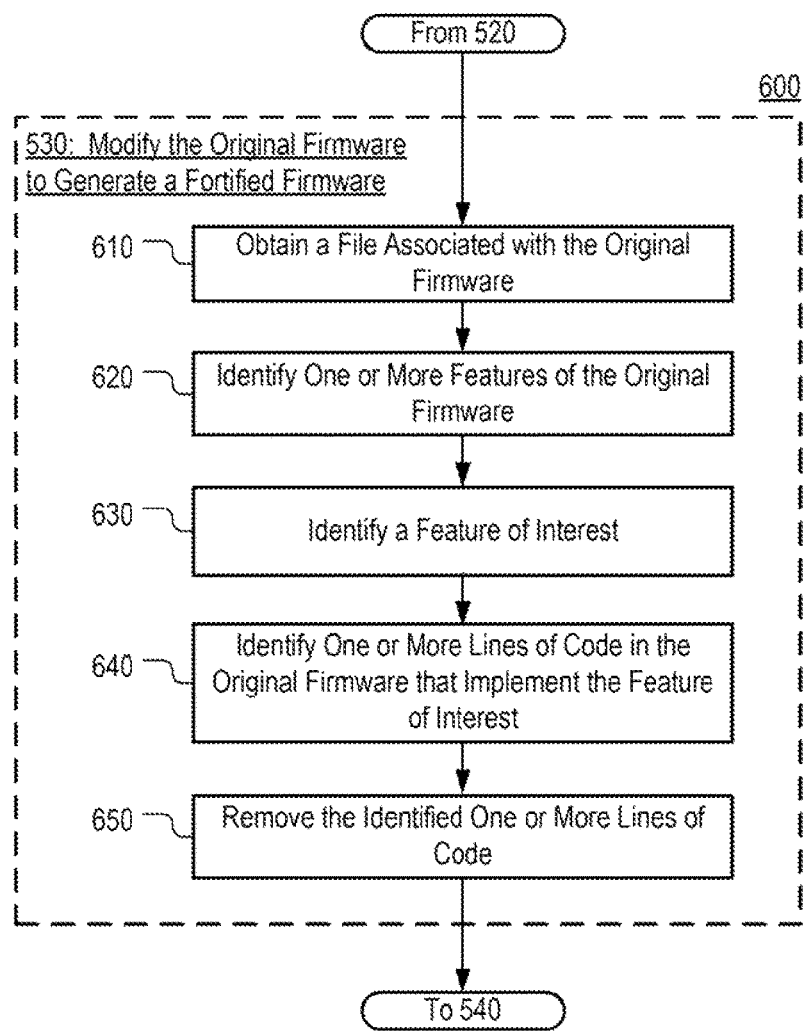
FIG. 6A is a flowchart of an illustrative process fro generating fortified firmware on an embedded device in accordance with some embodiments of the disclosed subject matter.

FIG. 6A illustrates a process 600 for removing at least a portion of code from original firmware 310, as specified by 530 of process 500. At 610, a file associated with original firmware 310 that identifies one or more features of the firmware can be obtained. Each of the identified features can represent a different capability of firmware 310 (e.g., remote firmware update, network connectivity, etc.). In some embodiments, the obtained file can be a configuration file that is part of original firmware 310. The configuration file, in some instances, can indicate whether different features in original firmware 310 are enabled or disabled. At 620, a list can be generated that identifies one or more features of original firmware 310 that are referenced in the configuration file. At 630, the list can then be examined to identify a feature of interest that meets a predetermined criterion. For example, the feature of interest can be identified upon determining one or more of the following:

F1: A feature that is considered to be vulnerable to exploitation (e.g., a remote firmware update capability);
F2: A feature that cannot be deactivated or disabled in original firmware 310 (e.g., a feature that original firmware 310 lacks the facilities or capabilities to disable in response to receiving an input from an administrator user)
F3: A feature that is not used by embedded device 110 (e.g., a feature that is intended for use by other printer models or other device models that share the same firmware with embedded device 110); and
F4: A feature that is deemed unnecessary by an administrator user.

At 640, a static and/or dynamic analysis can be performed on original firmware 310 to identify one or more code segments that implement the feature of interest. Each of the identified code segments can include one or more lines of instructions, such as function entry points, function or library routine return instruction locations, any other suitable program instruction or memory location, and/or any suitable combination thereof. The analysis can be performed on the original host program in order to determine areas of live code or code having a high probability of being run at runtime. In this example, code segment 605 that implements REV module 312 is identified (as shown in FIG. 6B.). At 650, the one or more code segments that implement the feature of interest can be removed from original firmware 310 to generate fortified firmware 320. In this example, code segment 605 is deleted. Removing the code for the feature of interest can, for example, reduce the potentially vulnerable attack surface of fortified firmware 320.

Figure 7A:
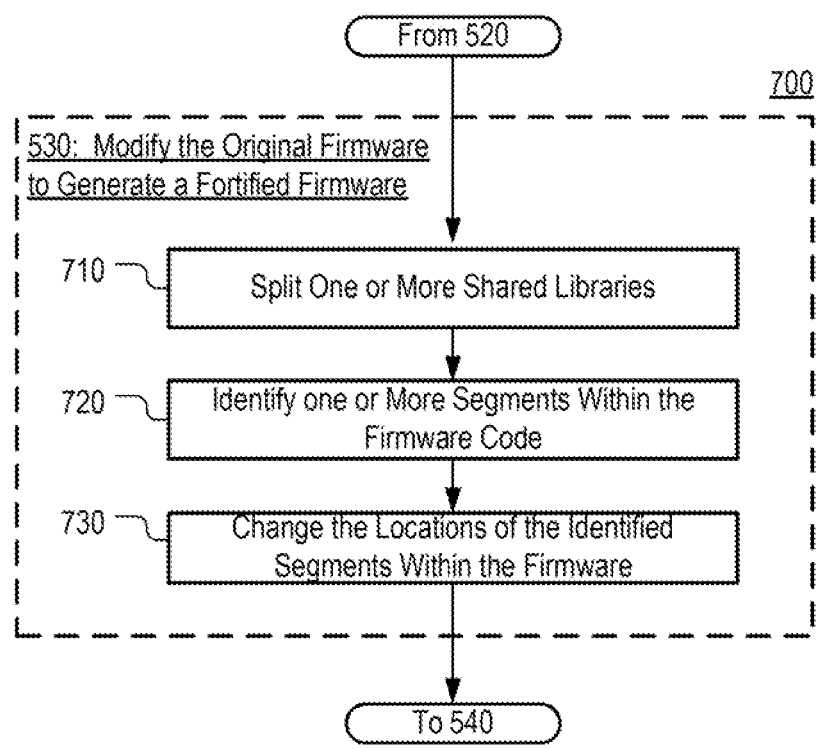
FIG. 7A is a flowchart of an illustrative process for fortifying firmware by library splitting and/or binary structure randomization approaches in accordance with some embodiments of the disclosed subject matter.

FIG. 7A illustrates a process 700 for mutating original firmware 310, as specified by step 530 of process 500. At 710, one or more shared libraries that are part of original firmware 310 can be split. More particularly, in this example, shared library 318 is split. In some embodiments, splitting the library can involve generating, identical or similar copies of the shared library (e.g., copies 318*a* and 318*b* of FIG. and replacing the shared library with the copies. Furthermore, in some embodiments, branch instructions in different code segments, such as code segments implementing network connectivity module 314 and printing module 316, can be modified so that instructions in each module branch to only one of the copies, but not the other. As such, each module can use a copy of the library that is not shared with another module.

At 720, one or more code segments in original firmware 310 can be identified. Each code segment can include one or more instructions. In some embodiments, the one or more code segments can be part of a shared library in original firmware 310, such as shared library 318 or one of its copies 318*a* and 318*b*. In some embodiments, making multiple copies of the shared library at 710 can facilitate randomizing the library by allowing the control flow of original firmware 310 to be preserved. Additionally or alternatively, in some embodiments, the one or more code segments identified at 720 can include branch instructions. In this example, code segments 705 and 715, which are shown in FIG. 7B, are identified.

At 730, the location of at least one code segment in original firmware 310 can be modified to generate fortified firmware 320. As illustrated in FIG. 7B, the instructions that form segment 705 and segment 715 can be moved to various locations within fortified firmware 320. Although the locations of the two code segments are swapped in the example of FIG. 7B, this is merely illustrative. For example, the location where a code segment is moved in fortified firmware 320 can be selected at random. Furthermore, it should be noted that, in some embodiments, other suitable techniques, such as those used to create polymorphic variants of malicious code, can be used to randomize and/or diversify the original firmware 310.

It should be noted that binary structure randomization can involve braking apart blocks of code and relocating them into randomly selected positions within the available memory space. It should also be noted that the fortified firmware image can, in some embodiments, be created offline prior to the embedded device or system executing the firmware. Accordingly, this can result in a reduction of performance impact at runtime as calculations and modifications can be performed each time the embedded device is booted up.

Alternatively, randomization or any other mutation features can be performed at runtime on the embedded device (e.g., on demand, when firmware updates are scheduled to occur on the embedded device, etc.). In addition, such randomization and/or other mutation features can continue as the embedded device firmware executes, thereby continuing to create mutating code that is functionally equivalent to the original firmware image.

Figure 8:
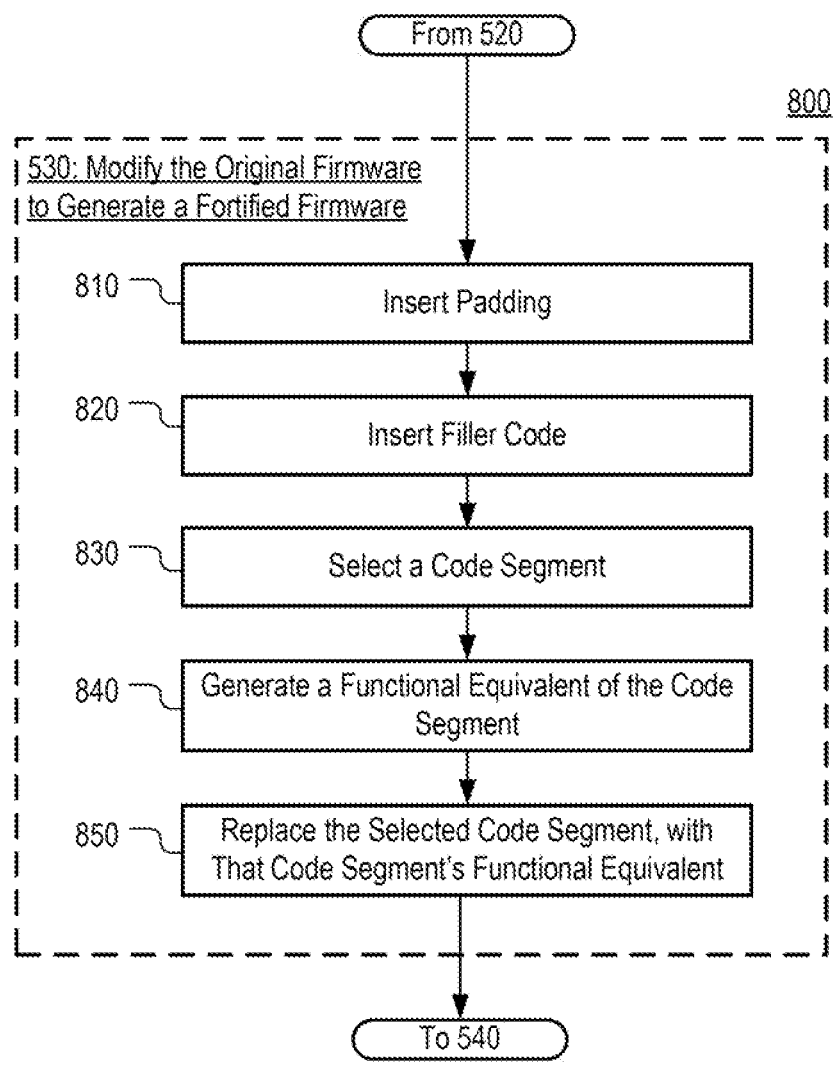
FIG. 8 is a flowchart of an illustrative process for generating fortified firmware that is functionally equivalent to the original firmware in accordance with some embodiments of the disclosed subject matter.

FIG. 8 illustrates a process 800 for inflating original firmware 310 as specified at step 530 of process 500. As discussed herein, inflating the firmware can include increasing the firmware's size without adding, new functionality to the firmware. At 810, padding can be inserted at the end of original firmware 310. For example, one or more predetermined strings can be appended to original firmware 310 in order to bring the total size of the firmware image to a predetermined value, such as the amount of memory available on embedded device 110 (e.g., the size of firmware memory 280). At 820, filler can be inserted into original firmware 310. Filler can include, for example, comments, instructions that can be invoked but do nothing (e.g., NOP machine instructions), etc. At 830, a code segment can be selected. The code segment can include one or more lines of code. At 840, a functionally equivalent version of the code can be created, either manually or automatically, and, at 850, the selected code segment can be replaced with its functional equivalent.

The host program and the fortified firmware can be analyzed, randomized, and/or mutated into a unique instantiation of the original host program. As described above, the fortified firmware can be functionally equivalent to the original host program. Accordingly, address space randomization and polymorphic mutation approaches can be used to increase the randomness and diversity of the host program and defensive mechanisms incorporated into the fortified firmware.

Figure 9A:
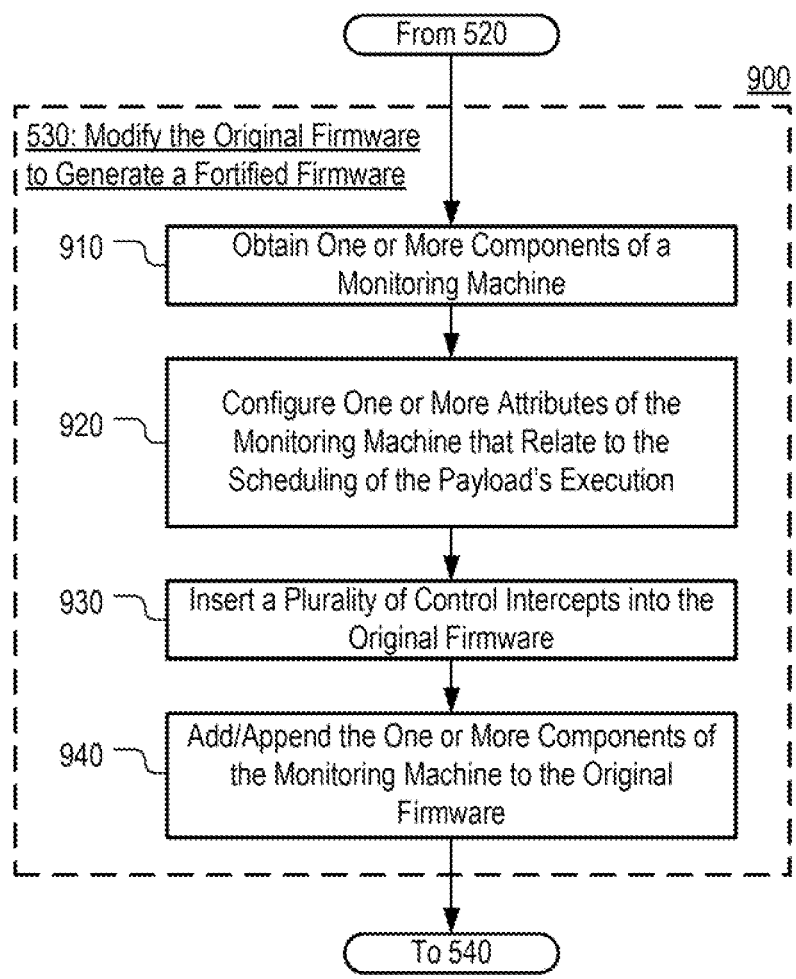
FIG. 9A is a flowchart of an illustrative process for injecting fortified firmware using control intercepts in accordance with some embodiments of the disclosed subject matter.

FIG. 9A illustrates a process 900 for injecting a monitoring machine into firmware 310 as specified by step 530 of process 500. For example, a monitoring machine or monitoring engine can be injected into a piece of arbitrary executable code to augment the target code with defensive capabilities.

Figure 9B:
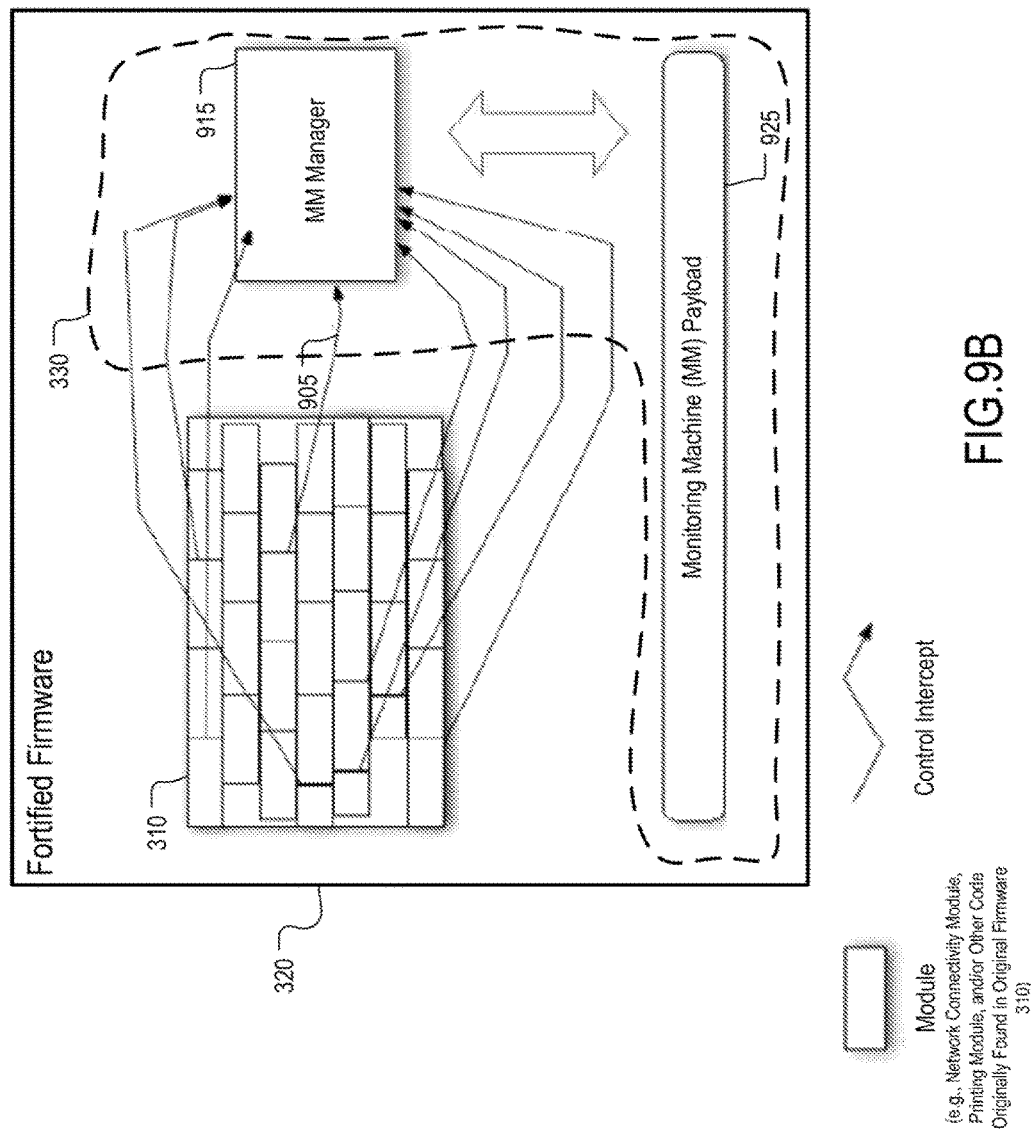
FIGS. 9B-9E are schematic diagrams showing examples of a monitoring machine that can be part of the fortified firmware in accordance with some embodiments of the disclosed subject matter.
Figure 9C:
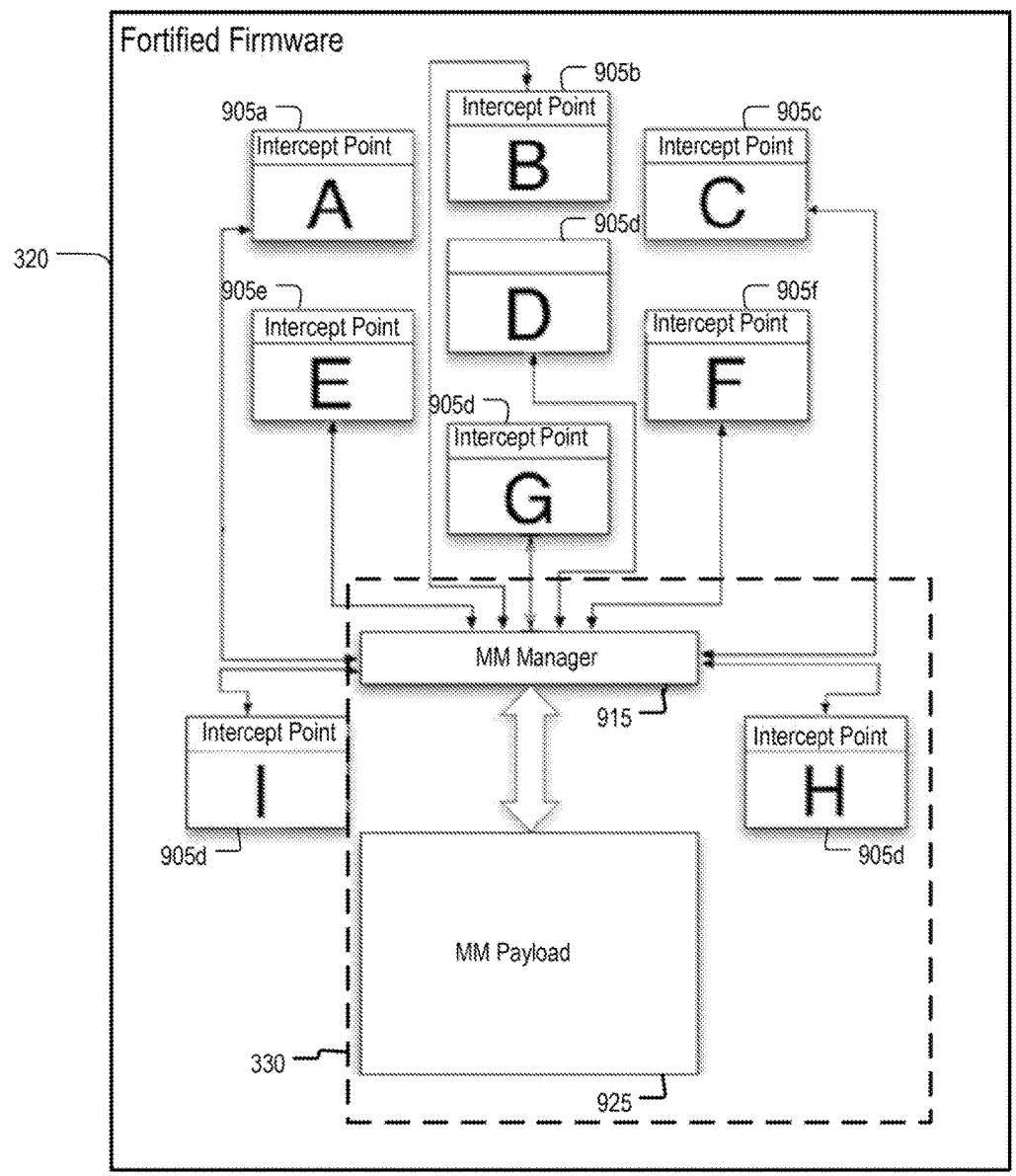
Figure 9D:
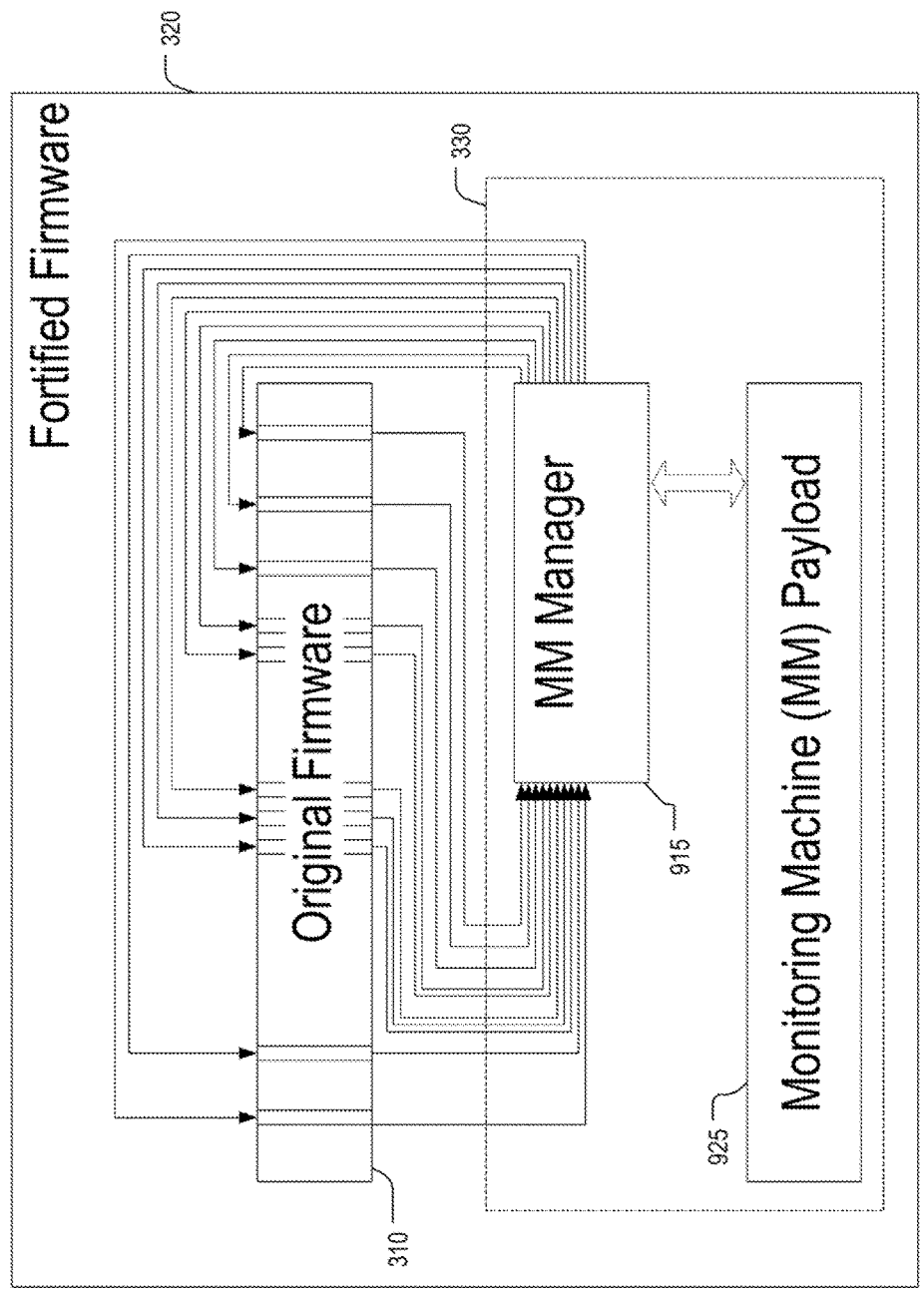

At 910, one or more components of monitoring machine 330 can be obtained. In this example, monitoring machine 330 has a hi-modular structure that includes a manager 915 and a payload 925, which are shown in FIGS. 9B, 9C, and 9D.

Figure 9E:
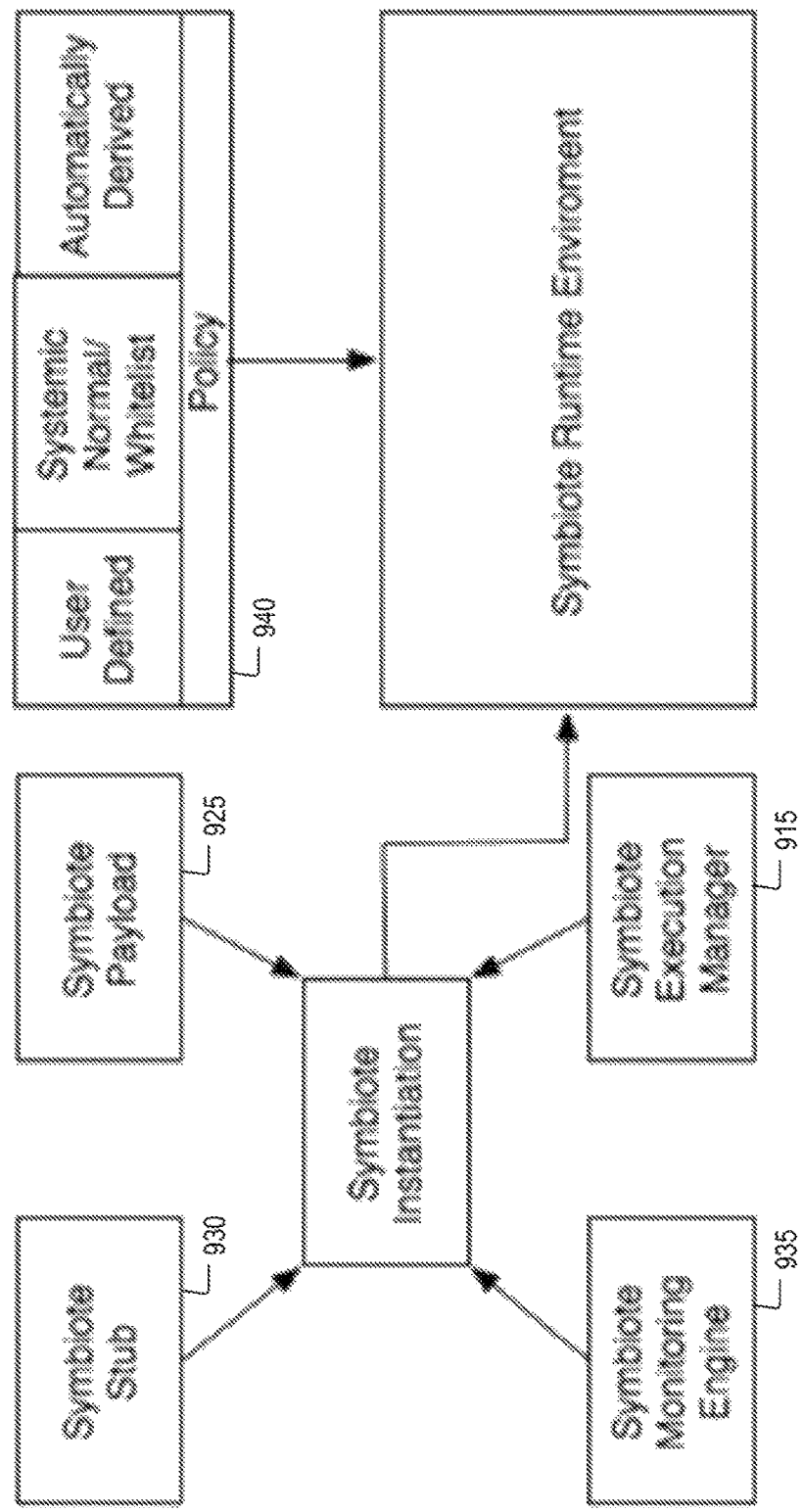

Alternatively, monitoring machine 330 shown in FIG. 9E includes a stub 930 that directs how the code is embedded into the host program and how tandem execution with the host program is accomplished, a payload 925 that includes defensives mechanisms executed in tandem with the host program (e.g., code integrity checkers, proof carrying codes, anomaly detectors, etc.), a monitoring engine 935 that acquires and organizes static and runtime information relating to the host program, and an execution manager 915 that manages resources (e.g., how and when the code and the host program are executed on the processor). It should be noted that monitoring machine 330 can also incorporate one or more rules or policies 940 for enforcement. These policies can include user-defined policies, a whitelist, automatically derived policies, etc.

Manager 915 can include one or more processor executable instructions that are invoked from within code that was originally part of original firmware 310. Manager 915 can perform context management functions, such as saving and restoring the context of embedded device 110. Additionally or alternatively, manager 915 can be configured to execute and/or schedule the execution of payload 925. For example, manager 915 can gain control of the processor and allocate a certain number of cycles for the execution of payload 925 (e.g., a checksum mechanism, an anomaly detection mechanism, a signature-based antivirus mechanism, etc.). In response, payload 925 can completes its execution burst and control of the processor is returned to manager 915, which in turn resumes the execution of the host program. Payload 925 can include one or more processor-executable instructions that implement an intrusion detection mechanism. The operation of manager 915 and payload 925 is further discussed in connection with FIGS. 10 and 11A-11B. In some embodiments, at least one of manager 915 and payload 925 can be completely self-contained. For example, manager 915 and/or payload 925 may not rely on any code facilities provided by original firmware 310.

In some embodiments, manager 915 can determine resource distribution between payload 925 and the host program. At 920, the length of the periods for which payload 925 can be executed by manager 915 is set in accordance with a predetermined rule. Examples of such rules include:

R1: Execute payload 925 for fixed durations of time (e.g., for 2s each time payload 925 is executed);

R2: Execute payload 925 for a duration of time that depends on the period lapsed since the last execution of payload 925 (e.g., the longer the period, the greater the burst length);

R3: Execute payload 925 for a duration of time that depends on amount processing, power of processor 260 of embedded device 110 the slower the processor, the shorter the burst length); and R4: Execute payload 925 for a duration of time that depends on the rate at which jobs arrive at embedded device 110 (e.g., the greater the length, the shorter the burst length).

In some embodiments, one or more instructions that are part of manager 915 can be modified in order to implement a rule, such as rules R1-R4.

It should be noted that any suitable scheduling approach can be used to determine resource distribution between payload 925 and the host program. Generally speaking, the scheduling approach performed by manager 915 can be based at least in part on the frequency of context switches and the duration of the execution bursts of payload 925. For example, manager 915 can optimize the scheduling approach to balance both the frequency of context switches and the duration of the execution bursts of payload 925. In a more particular example, payload 925 can detect unauthorized code modifications by computing checksums over static regions of memory. In another more particular example, payload 925 can implement an anomaly detector that provides security for the embedded device (e.g., using an anomaly-based filter, using a signature-based filter, etc.). Accordingly, a delay exists between the time of the code modification and its detection, which is sometimes referred to as detection latency. As such, the amount of the processing, resources that are diverted to payload 925 can be configured such that it is inversely proportional to the detection latency and directly proportional to the performance of the detection mechanism. For example, manager 915 can determine that short execution bursts of payload 925 are interleaved with the execution of the host program, thereby allowing payload 925 to compete at particular rates while minimizing the impact on the real-time nature of the embedded device (e.g., routing packets by a router).

At 930 control intercepts 905 (shown in FIGS. 9B-9D) can be distributed throughout the body of original firmware 310. Each of the control intercepts can include one or more instructions (e.g., branch instructions) that are capable of redirecting the control flow of embedded device 110 from a code segment found in original firmware 310 (e.g., modules 314, 316, 318*a* or 318*b*) to monitoring machine 330. For example, as shown in FIG. 9B, control code and its executed payload are dispersed throughout a binary using gaps of unused memory created by block allocation assignment. In another example, control-flow intercepts can be injected into the host program binary, yielding a protected host program. That is, these control intercepts provide an approach to re-divert a portion of the embedded device's processor cycles to execute payload 925. This allows the monitoring machine to remain agnostic to operating system specifics while executing its payload alongside the original operating system. Moreover, payload 925 has access to the internals of the original operating system, but is not constrained by it. At 940, monitoring machine 330 can be injected into original firmware 310. In some embodiments, monitoring machine 330 can include manager 915 and payload 925 (shown in FIGS. 9B-9D). In that regard, injecting monitoring machine 330 into original firmware 310 can include inserting or appending manager 915 and/or payload 925 into the original firmware, in a manner that allows the control flow intercepts inserted at 930 to point to manager 915.

FIGS. 9B-9D illustrate approaches for inserting monitoring machine 330 into original firmware 310 in accordance with some embodiments of the disclosed subject matter. As illustrated, intercepts 905*a-h* can be inserted in various intercept points in original firmware 310. In some embodiments, the locations where the intercepts are inserted can be chosen out of candidate live code segments within firmware 310. The manner in which code segments are classified as live, as well as the number of intercepts chosen from each region (e.g., module) can affect the frequency in which the injected monitoring machine is executed. Optionally, both static and dynamic analysis can be performed on original firmware 310, by the system executing process 500, to estimate a likelihood of different code segments being executed during a predetermined time period. In some embodiments, a code segment can be classified as live code if the probability meets (e.g. equals or exceeds) a predetermined threshold. As illustrated in FIG. 9D, when code belonging to original firmware 310 is executed, and one of the intercept points is reached, the control intercept that has been placed at that point redirects the control flow of embedded device 110 to manager 915. Manager 915 can, in turn, further redirect the control flow of embedded device 110 to payload 925. When the execution of payload 925 and manager 915 is completed, the control flow of embedded device 110 can return to the point where execution of code belonging to original firmware 310 was left off to execute manager 915 and payload 925. The execution of code belonging original firmware 310 can continue until another, or the same, intercept point is reached once again. The operation of manager 915 and payload 925 is discussed in further detail with respect to FIGS. 10 and 11A-11C.

Figure 10:
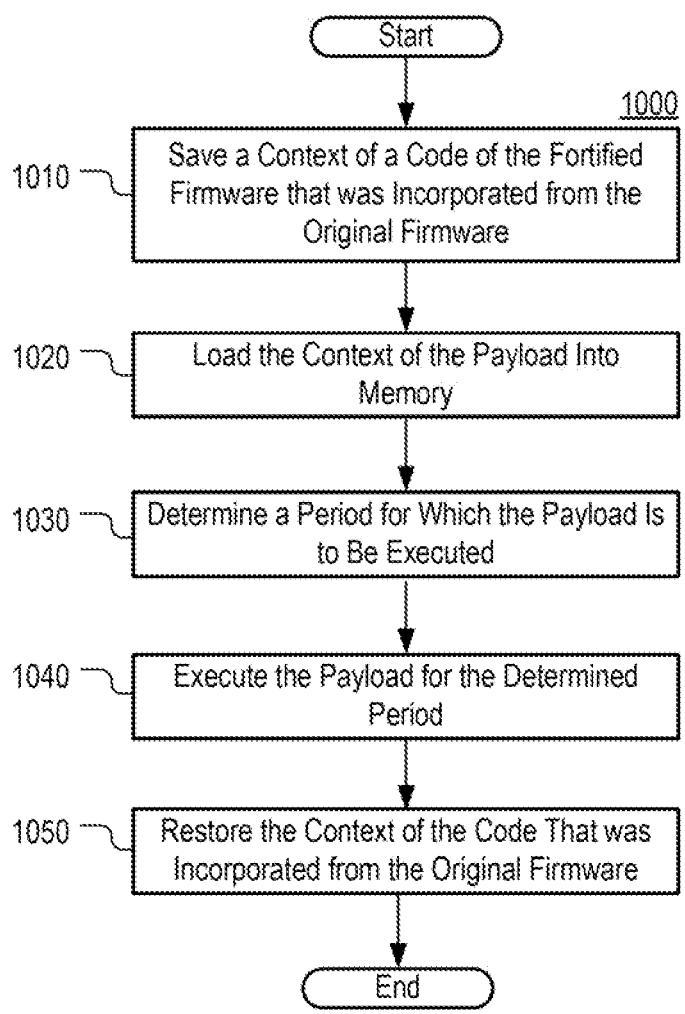
FIG. 10 is a flowchart of an illustrative process for managing the execution of an injected payload in accordance with some embodiments of the disclosed subject matter.

FIG. 10 illustrates a process 1000 that can be performed by manager 915 in accordance with some embodiments of the disclosed subject matter. At 1010, manager 915 can save the context of code of fortified firmware 320 in storage memory 270 and/or firmware memory 280. The code whose context is stored is the code which was included in fortified firmware 320 from original firmware 310. At 1020, manager 915 can load the context of payload 925 into the registers of processor 260.

At 1030, manager 915 can determine a period of time for which payload 925 is to be executed. The duration can range from zero, such as when manager 915 refrains from executing payload 925, to any suitable value. In some embodiments, manager 915 can execute payload 925 for the same duration every time payload 925 is executed. Additionally or alternatively, in some embodiments, manager 915 can employ an inverse-adaptive approach where the duration of the time period for which payload 920 is executed is based on the elapsed time since payload 925 was last executed. For example, the longer the elapsed time, the longer the period for which payload 925 is executed. It should be noted that, although the embodiments described herein provide a schedule for resource allocation, this is merely illustrative. Any particular scheduling, approach can be used and the duration of the time period for which payload 925 is to be executed can depend on any suitable characteristic of the state of embedded device 110, such as load on embedded device 110 (e.g., rate of arrival of print jobs, or packets if embedded device 110 is a switch) or load on processor 260 of embedded device 110. In some embodiments, manager 915 can set a timer interrupt, that is configured to be triggered when the determined time has expired. In addition, manager 115 can also modify an interrupt vector table on embedded device 110 to identify itself as the handler for that timer interrupt.

At 1040, payload 925 can be executed for the predetermined period of time. At 1050, the context of payload 925 can be saved in one of storage memory 270 or firmware memory 280, and the context of the firmware code that is saved at 1010 can be restored.

Figure 11A:
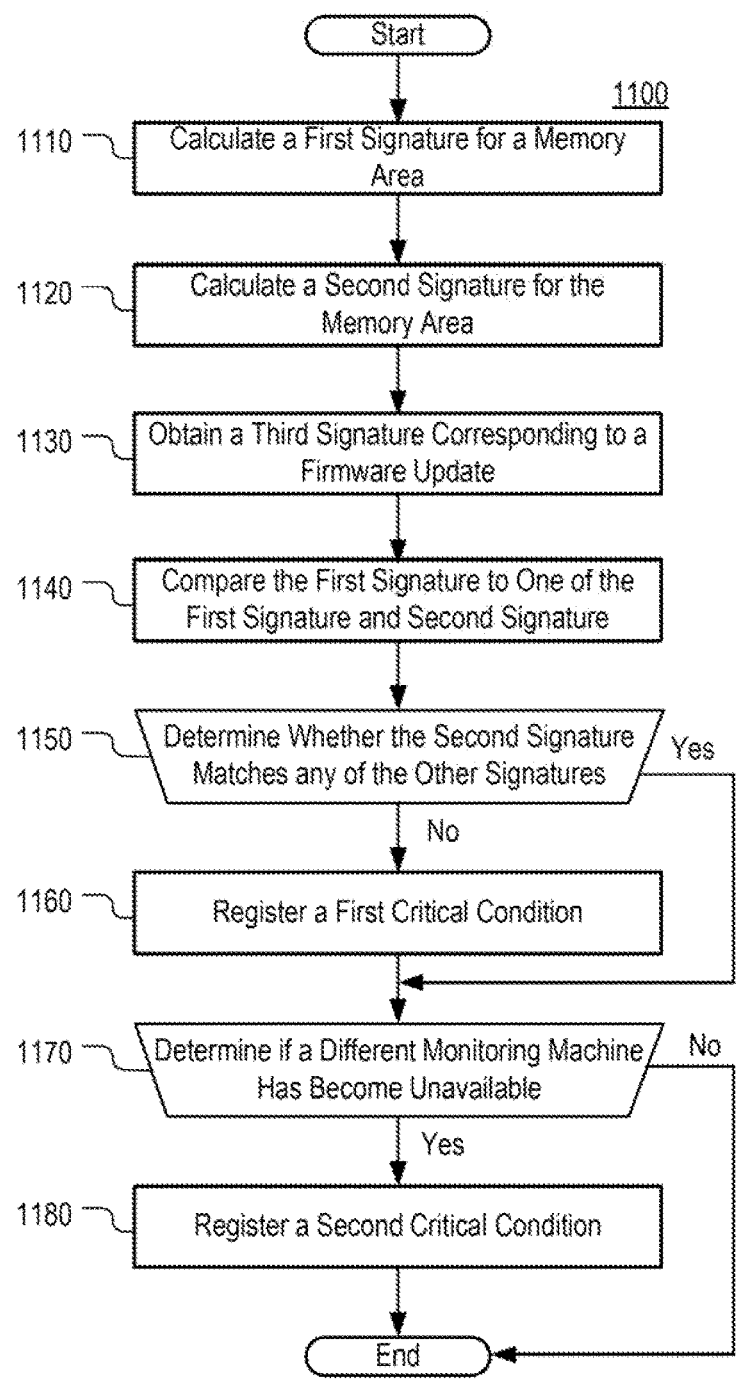
FIG. 11A is a flowchart of an illustrative process for implementing multiple monitoring machines in accordance with some embodiments of the disclosed subject matter.

FIG. 11A illustrates a process 1100 performed by a payload, such as payload 925, in accordance with some embodiments of the disclosed subject matter. In a more particular embodiment, the payload can be used to detect unauthorized code modification through the determination of checksums over static regions of memory. In another more particular embodiment, the payload can be used to detect unauthorized code modification through an anomaly detector (e.g., having an anomaly-based filter and/or a signature-based filter).

In some embodiments, the payload can also be implemented using a return-oriented programming (ROP) technique. In this example, the payload, such as payload 925, can be implemented as a ROP program that hardens the fortified firmware from being identified by an attacker. Upon identifying sequences of original host program instructions that implement a particular instruction or operation (sometimes referred to as "gadgets"), sequences of gadgets can be composed into a program that make the payload appear similar to the host program.

At 1110, a first signature for a memory area in embedded device 110 can be determined. In some embodiments, the memory area can be one that is semantically static. In some embodiments, the memory area can be one that is potentially executable. Additionally or alternatively, in some embodiments, the memory location can be any non-volatile memory that is part of embedded device 110. The non-volatile memory can be part of any component of embedded device 110 such as a network controller card (e.g., communications interface 220), the main formatter board (e.g., formatter board 250), print engine controller 240 or another SoC device that is part of embedded device 110, the boot flash, other compact flash devices, and even an board stacker or stapler unit. Thus, in some embodiments, the memory area for which the first signature is calculated can be located on a component, or component portion, that is purpose-specific to the function which the embedded device is designated (e.g., printing, scanning, providing media content, routing packets, converting packets from one protocol to another, etc.). In some aspects, integrity verification on embedded devices, such as networked printers, can be particularly challenging as such devices can include a number of NVRAM-like devices capable of code execution where malicious code can be concealed.

It should be noted that the memory area whose signature can be determined can be of any suitable length. For example, the length can extend over one memory address or multiple memory addresses that are either contiguous or non-contiguous. The first signature can be any suitable signature, such as a hash, that is cryptographically secure. Additionally or alternatively, in some embodiments, the first signature can be a checksum signature.

At 1120, a second signature can be calculated for the same memory area. The second signature can be calculated, for example, after the first signature is calculated and can be of the first type as the first signature. In some embodiments, the second signature and the first signature can be calculated during different executions of payload 925. At 1130, a third signature can be obtained for a static update to fortified firmware 320 that can result in the code of fortified firmware 320 that is located at the predetermined location being altered. The third signature can be a signature for approved static updates that is calculated and transmitted over network 108 by administrator computer 126 prior to the execution of 1130. The third signature can indicate the content that is expected to be stored in the memory area after the update is identified.

At 1140, the first signature can be compared to at least one of the second signature or third signature. In some embodiments, the second signature can be compared to the first signature. At 1150, it can be determined whether the first signature matches at least one of the other signatures based on the comparison at 1140. If the first signature does not match any of the signatures, a first critical condition can be registered at 1150. Registering the first critical condition can include transmitting to administrator computer 126 (see, e.g., FIGS. 11B-11C), over network 108, an indication of the mismatch, or displaying the indication on a display screen of embedded device 110. In some embodiments, by comparing signatures for the same memory areas that were calculated at different times, payload 925 can detect attempts by hackers or attackers to patch the memory of embedded device 110 and install malicious code. Furthermore, in some embodiments, by comparing the signature for the memory area to the signature for a firmware update can inhibit a false alarm from being raised or activated, by payload 925 when the update is installed.

In response to determining that the first signature matches one of the other signatures, the execution of process 1100 can skip to 1160. At 1160, it can be determined whether a second monitoring machine has been disabled. The second monitoring machine can be executing on embedded device 110 or on another embedded device in network 108 (e.g., another network printer, a router, etc.). In some embodiments, the determination can be made based on embedded device 110 failing to receive a heartbeat signal or any other suitable signal from the second monitoring machine. Additionally or alternatively, in some embodiments, the determination can be made based on the second monitoring machine failing to respond to a status request that is transmitted by payload 925 or any other suitable component. When it is determined that the second device has become unavailable, a second critical condition can be registered at 1170. Registering the second critical condition can include transmitting to administrator computer 126, network 108, an indication that the other monitoring machine has become unavailable or displaying the indication on a display screen of embedded device 110.

Figure 11B:
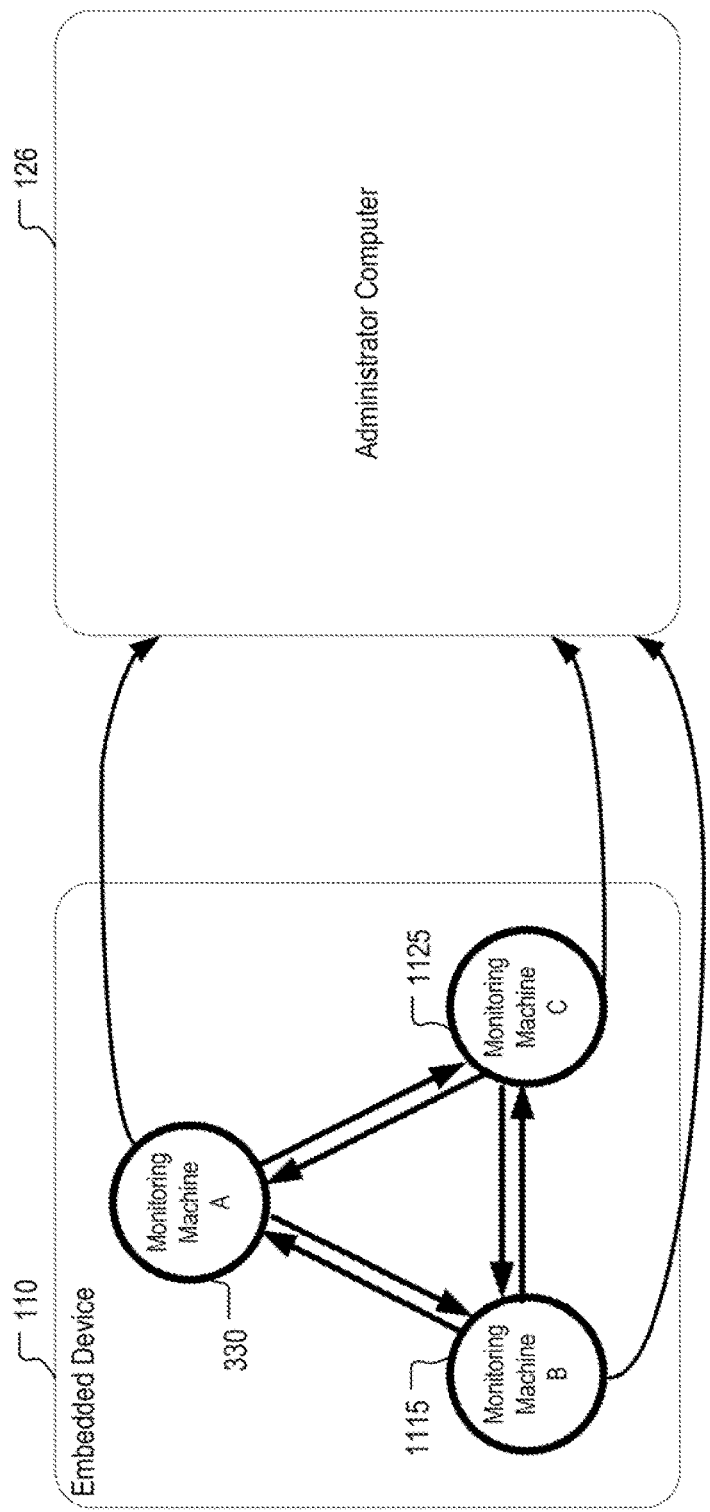
FIG. 11B is a schematic diagram showing an illustrative example of multiple monitoring machines that are instantiated on an embedded device in accordance with some embodiments of the disclosed subject matter.

As illustrated in FIG. 11B, in some embodiments, monitoring machines 1115 and 1125 can also be injected into original firmware 310, thus causing embedded device 110 to execute multiple monitoring machines 330, 1115, and 1125. Once injected, each of the monitoring machines can track the status of one or more of the other machines, in the manner discussed with respect to 1160 and transmit an alert to administrator computer 126 when one or more of the other monitoring machines become unavailable. For example, each monitoring machine (e.g., one of 330, 1115, and 1125) can monitor an embedded device or a particular condition within an embedded device and can monitor the operational status or any other suitable condition of the other monitoring machines within the network. In that regard, a sensor grid of monitoring machines can be implemented within embedded device 110 that detects attack attempts against one or more monitoring machines executing on the device.

In some embodiments, in response to detecting that the monitoring machines (e.g., monitoring machines 330, 1115, and 1125) have been simultaneously deactivated or otherwise disabled, an external sensor can trigger an alarm (e.g., via a covert channel).

It should be noted that, although the embodiments generally described herein relate to monitoring machines executing within the same embedded device, this is merely illustrative. For example, monitoring machines can be injected into multiple embedded devices associated with one or more networks.

Figure 12:
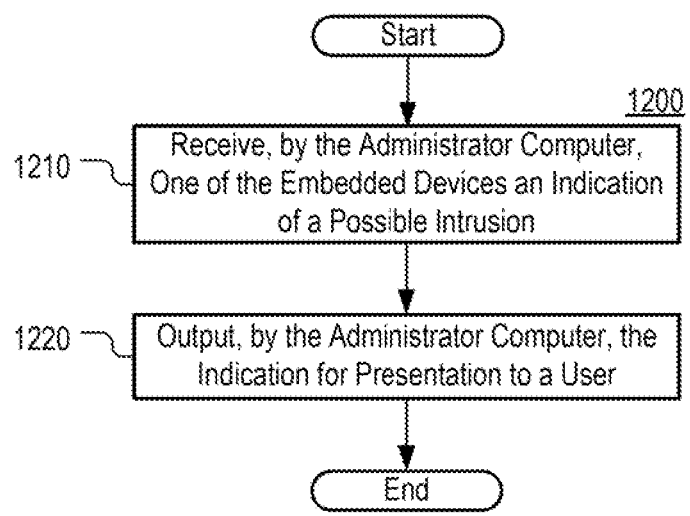
FIG. 12 is a flowchart of an illustrative process for triggering an alarm relating to the detection of an intrusion in accordance with some embodiments of the disclosed subject matter.

FIG. 12 illustrates a process 1200 for presenting alerts that can be performed by administrator computer 126 in accordance with some embodiments of the disclosed subject matter. At 1210, administrator computer 126 can receive an indication of intrusion into one of embedded devices 110, 112, and 114. The indication can be transmitted by a monitoring machine, such as monitoring machine 330, that is installed onto one of the embedded devices. In some embodiments, the indication can indicate that a particular memory location in one of the embedded devices has been overwritten or modified. Additionally or alternatively, the indication can indicate that a monitoring machine, other than the one transmitting the indication, has been deactivated or disabled. In some embodiments, the indication can include an identifier for the peripheral device that is being intruded or associated information, such as the type of the device (e.g., printer, router, scanner, etc.). At 1220, the indication can be output for presentation to a user. For example, administrator computer 126 can trigger an alarm by displaying text or an image, playing a sound, activating a tactile feedback device, or in any other suitable manner. In a more particular example, the alarm indicator can be transmitted and displayed to an administrator user.

It should be noted that, although the embodiments described herein generally relate to injecting the fortified firmware directly onto an embedded device (e.g., a particular printer, router, phone, etc.), this is merely illustrative. When the fortified firmware is directly injected onto an embedded device, the payload can execute on the hardware of the embedded device alongside the original firmware. This native implementation can be used, for example, in embedded systems for which emulation is not feasible (e.g., embedded devices that cannot be emulated by software due to the use of undocumented and/or proprietary hardware). Instead of running the fortified firmware on the hardware of the embedded device, the fortified firmware can be emulated on a processing device (e.g., including a processing device external to the embedded device or an administrative computing device that manages or is connected to the embedded device). For example, in response to the payload emitting or triggering an alarm, the emulator can halt the processor of the embedded device and capture the memory state of the embedded device. In a more particular example, the emulator can continuously dump the memory state of the embedded device at a configurable frequency (e.g., where it can be archived for analysis). This emulated implementation can be used, for example, to allow for debugging in an emulated environment and to allow for greater computational capacity than the processor or other hardware of the embedded device.

Alternatively, a shadow sensor can be implemented. For example, when the embedded device is a router, incoming network traffic to the router can be mirrored from the embedded device to a shadow device having the injected fortified firmware. The fortified firmware can monitor the shadow device, where alerts can be triggered and emitted in response to detecting malicious activity.

It should be understood that the above described steps of the flow diagram of FIGS. 5, 6A, 7A, 8, 9A, 10, 11A, and 12 can be executed or performed in any order or sequence not hunted to the order and sequence shown and described in the figure. For example, 610 and 620 of FIG. 6A can be omitted and one or more features of interest can be identified via, user input or by hardcoding an indication of the feature into the system executing process 600 (e.g., administrator computer 126 or embedded device 110). Also, some of the above steps of the flow diagram of FIGS. 5, 6A, 7A, 8, 9A, 10, 11A, and 12 can be executed or performed substantially simultaneously where appropriate or in parallel to reduce latency and processing times.

Accordingly, methods, systems, and media for inhibiting attacks on embedded devices are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims which follow. Features of the disclosed embodiments can be combined and rearranged in various ways.

What is claimed is:

1. A system for inhibiting attacks on embedded devices, the system comprising a processor configured to:
   identify an embedded device that is configured to provide one or more services to one or more digital processing devices within a communications network;
   receive a first firmware having binary executable code associated with the embedded device; and
   generate a second firmware that is functionally equivalent to the first firmware for execution by the embedded device by:
   determining unused binary executable code and data associated with the binary executable code within the first firmware;
   removing the unused binary executable code and data to create free memory locations within the second firmware; and
   using the free memory locations to restructure remaining binary executable code and data into memory positions and insert a plurality of payloads and at least one policy within the second firmware, wherein the plurality of payloads includes a first payload that includes program instructions for providing a first defensive capability to the embedded device and a second payload that includes program instructions for providing a second defensive capability to the embedded device and wherein the first defensive capability is a different type than the second defensive capability.

2. The system of claim 1, wherein the processor is further configured to generate the second firmware by adding one or more program instructions that, when executed by the embedded device, detect an intrusion into the embedded device.

3. The system of claim 2, wherein the intrusion is detected by determining a first checksum on a memory portion of the embedded device at a first time period, determining a second checksum on the memory portion of the embedded device at a second time period, and comparing the first checksum with the second checksum.

4. The system of claim 2, wherein one of the plurality of payloads includes an anomaly detector that, when executed by the embedded device, causes the embedded device to detect the intrusion by executing the anomaly detector.

5. The system of claim 4, wherein the anomaly detector includes at least one of: an anomaly-based filter and a signature-based filter.

6. The system of claim 1, wherein the processor is further configured to cause the embedded device to execute program instructions associated with the first firmware for a first period of time and execute program instructions associated with the second firmware for a second period of time.

7. The system of claim 2, wherein the processor is further configured to cause the embedded device to receive an indication of the intrusion into the embedded device.

8. The system of claim 1, wherein the second firmware that is functionally equivalent to the first firmware is generated by transmitting a request to generate the second firmware to a second processor located external to the embedded device.

9. The system of claim 8, wherein the request to generate the second firmware is transmitted in response to detecting that the embedded device has been booted.

10. The system of claim 1, wherein the processor is further configured to:
determine which binary executable code and data associated with the binary executable code within the first firmware are active; and
in response to determining that a portion of binary executable code or a portion of data from the first firmware is not active, remove the portion of binary executable code or the portion of data from the first firmware.

11. The system of claim 1, wherein the processor is further configured to mutate at least a portion of the remaining binary executable code or at least a portion of the data associated with the remaining binary executable code within the first firmware by relocating the portion of the remaining binary executable code or the portion of the data associated with the remaining binary executable code from a first memory location to a second memory location.

12. The system of claim 1, wherein the processor is further configured to:
generate a plurality of firmware images, wherein each of the plurality of firmware images is assigned to monitor an intrusion condition;
inject the plurality of firmware images into the embedded device, wherein each of the plurality of firmware images is further assigned to monitor an operational state associated with other firmware images executing on the embedded device; and
receive an alert in response to receiving, from one of the plurality of firmware images, at least one of: the intrusion condition and the operational state indicating that one of the plurality of firmware images has been disabled.

13. A system for inhibiting attacks on embedded devices, the system comprising a processor configured to:
identify an embedded device that is configured to provide one or more services to one or more digital processing devices within a communications network;
receive a first firmware associated with the embedded device;
determine that at least a portion of program instructions in the first firmware includes a shared library;
generate a copy of the shared library; and
generate a second firmware that is functionally equivalent to the first firmware for execution by the embedded device by:
determining unused binary executable code within the first firmware;
removing the unused binary executable code to create free memory locations within the second firmware; and
using the free memory locations to restructure remaining binary executable code into memory positions and insert at least one defensive payload and at least one policy within the second firmware, wherein the at least the portion of the program instructions is linked to the copy of the shared library.

14. A system for inhibiting attacks on embedded devices, the system comprising a processor configured to:
identify an embedded device that is configured to provide one or more services to one or more digital processing devices within a communications network;
receive a first firmware associated with the embedded device; and
generate a second firmware that is functionally equivalent to the first firmware by:
determining unused binary executable code within the first firmware;
removing the unused binary executable code to create free memory locations within the second firmware; and
using the free memory locations to restructure remaining binary executable code into memory positions and insert at least one defensive payload and at least one policy into the second firmware;
wherein the second firmware is configured to:
inject a payload that includes program instructions for detecting intrusions into the embedded device;
store a system execution context of an operating system executing on the embedded device;
determine a time period for executing the payload based at least in part on processing resources associated with the embedded device;
execute the payload for the time period;
store a payload execution context of the payload in response to the determining that the time period has elapsed; and
load the system execution context of the operating system to continue operation of the embedded device.

15. A method for inhibiting attacks on embedded devices, the method comprising:
identifying an embedded device that is configured to provide one or more services to one or more digital processing devices within a communications network;
receiving a first firmware having binary executable code associated with the embedded device; and
generating a second firmware that is functionally equivalent to the first firmware for execution by the embedded device by:

determining unused binary executable code and data associated with the binary executable code within the first firmware;

removing the unused binary executable code and data to create free memory locations within the second firmware; and using the free memory locations to restructure remaining binary executable code and data into memory positions and insert a plurality of payloads and at least one policy within the second firmware, wherein the plurality of payloads includes a first payload that includes program instructions for providing a first defensive capability to the embedded device and a second payload that includes program instructions for providing a second defensive capability to the embedded device and wherein the first defensive capability is a different type than the second defensive capability.

16. The method of claim 15, further comprising generating the second firmware by adding one or more program instructions that, when executed by the embedded device, detect an intrusion into the embedded device.

17. The method of claim 16, further comprising detecting the intrusion by determining a first checksum on a memory portion of the embedded device at a first time period, determining a second checksum on the memory portion of the embedded device at a second time period, and comparing the first checksum with the second checksum.

18. The method of claim 16, wherein one of the plurality of payloads includes an anomaly detector that, when executed by the embedded device, causes the embedded device to detect the intrusion by executing the anomaly detector.

19. The method of claim 18, wherein the anomaly detector includes at least one of: an anomaly-based filter and a signature-based filter.

20. The method of claim 15, further comprising causing the embedded device to execute program instructions associated with the first firmware for a first period of time and execute program instructions associated with the second firmware for a second period of time.

21. The method of claim 15, further comprising causing the embedded device to receive an indication of an intrusion into the embedded device.

22. The method of claim 15, further comprising:
determining which binary executable code and data associated with the binary executable code within the first firmware are active; and
in response to determining that a portion of binary executable code or a portion of data from the first firmware is not active, removing the portion of binary executable code or the portion of data from the first firmware.

23. The method of claim 15, wherein the second firmware that is functionally equivalent to the first firmware is generated by transmitting a request to generate the second firmware to a second processor located external to the embedded device.

24. The method of claim 23, wherein the second firmware is generated from the second processor in response to at least one of: detecting that the embedded device has been booted and transmitting the request to the second processor for the second firmware.

25. The method of claim 15, further comprising mutating at least a portion of the remaining binary executable code or at least a portion of the data associated with the remaining binary executable code within the first firmware by relocating the portion of the remaining binary executable code or the portion of the data associated with the remaining binary executable code from a first memory location to a second memory location.

26. The method of claim 15, further comprising:
generating a plurality of firmware images, wherein each of the plurality of firmware images is assigned to monitor an intrusion condition;
injecting the plurality of firmware images into the embedded device, wherein each of the plurality of firmware images is further assigned to monitor an operational state associated with other firmware images executing on the embedded device; and
receiving an alert in response to receiving, from one of the plurality of firmware images, at least one of: the intrusion condition and the operational state indicating that one of the plurality of firmware images has been disabled.

27. A method for inhibiting attacks on embedded devices, the method comprising:
identifying an embedded device that is configured to provide one or more services to one or more digital processing devices within a communications network;
receiving a first firmware associated with the embedded device;
determining that at least a portion of program instructions in the first firmware includes a shared library;
generating a copy of the shared library; and
generating a second firmware that is functionally equivalent to the first firmware for execution by the embedded device by:
determining unused binary executable code within the first firmware;
removing the unused binary executable code to create free memory locations within the second firmware; and
using the free memory locations to restructure remaining binary executable code into memory positions and insert at least one defensive payload and at least one policy within the second firmware, wherein the at least the portion of the program instructions is linked to the copy of the shared library.

28. A method for inhibiting attacks on embedded devices, the method comprising:
identifying an embedded device that is configured to provide one or more services to one or more digital processing devices within a communications network;
receiving a first firmware associated with the embedded device; and
generating a second firmware that is functionally equivalent to the first firmware for execution by the embedded device by:
determining unused binary executable code within the first firmware;
removing the unused binary executable code to create free memory locations within the second firmware; and
using the free memory locations to restructure remaining binary executable code into memory positions and insert at least one defensive payload and at least one policy within the second firmware;
wherein the second firmware is configured to:
inject a payload that includes program instructions for detecting intrusions into the embedded device;
store a system execution context of an operating system executing on the embedded device;

determine a time period for executing the payload based at least in part on processing resources associated with the embedded device;

execute the payload for the time period;

store a payload execution context of the payload in response to the determining that the time period has elapsed; and load the system execution context of the operating system to continue operation of the embedded device.

29. A non-transitory computer-readable medium containing computer-executable instructions that, when executed by a processor, cause the processor to perform a method for inhibiting attacks on embedded devices, the method comprising:

identifying an embedded device that is configured to provide one or more services to one or more digital processing devices within a communications network;

receiving a first firmware having binary executable code associated with the embedded device; and generating a second firmware that is functionally equivalent to the first firmware for execution by the embedded device by:

determining unused binary executable code and data associated with the binary executable code within the first firmware;

removing the unused binary executable code and data to create free memory locations within the second firmware; and using the free memory locations to restructure remaining binary executable code and data into memory positions and insert a plurality of payloads and at least one policy within the second firmware, wherein the plurality of payloads includes a first payload that includes program instructions for providing a first defensive capability to the embedded device and a second payload that includes program instructions for providing a second defensive capability to the embedded device and wherein the first defensive capability is a different type than the second defensive capability.

* * * * *

UNITED STATES PATENT AND TRADEMARK OFFICE
CERTIFICATE OF CORRECTION

PATENT NO. : 10,341,378 B2
APPLICATION NO. : 15/136581
DATED : July 2, 2019
INVENTOR(S) : Ang Cui and Salvatore J. Stolfo Page 1 of 1

It is certified that error appears in the above-identified patent and that said Letters Patent is hereby corrected as shown below:

In the Specification

Column 1, Lines 25-29, please replace the paragraph under the header "Statement Regarding Federally Sponsored Research Or Development" with the following paragraph:
--The invention was made with government support under FA8750-10-2-0253 and FA8750-09-1-0075 awarded by the Air Force Research Laboratory, Information Directorate and FA8650-10-C-7024 awarded by Air Force Materiel Command Legal Office. The government has certain rights in the invention.--

Signed and Sealed this
Seventh Day of April, 2020

Andrei Iancu
*Director of the United States Patent and Trademark Office*